United States Patent
Shibutani et al.

(10) Patent No.: US 12,428,524 B2
(45) Date of Patent: *Sep. 30, 2025

(54) FLUORINE-CONTAINING COPOLYMER

(71) Applicant: DAIKIN INDUSTRIES, LTD., Osaka (JP)

(72) Inventors: Shouta Shibutani, Osaka (JP); Shingo Okuno, Osaka (JP); Masatoshi Nose, Cheonan-si (KR)

(73) Assignee: DAIKIN INDUSTRIES, LTD., Osaka (JP)

( * ) Notice: Subject to any disclaimer, the term of this patent is extended or adjusted under 35 U.S.C. 154(b) by 785 days.

This patent is subject to a terminal disclaimer.

(21) Appl. No.: 17/685,498

(22) Filed: Mar. 3, 2022

(65) Prior Publication Data

US 2022/0195115 A1  Jun. 23, 2022

Related U.S. Application Data

(63) Continuation of application No. PCT/JP2020/033655, filed on Sep. 4, 2020.

(30) Foreign Application Priority Data

Sep. 4, 2019  (JP) .................... 2019-161528

(51) Int. Cl.
C08G 65/00  (2006.01)
C08L 53/00  (2006.01)

(52) U.S. Cl.
CPC ............ C08G 65/007 (2013.01); C08L 53/00 (2013.01); *C08G 2150/00* (2013.01); *C08G 2650/48* (2013.01)

(58) Field of Classification Search
CPC .............................. C09D 163/00; C08L 53/00
See application file for complete search history.

(56) References Cited

U.S. PATENT DOCUMENTS

| | | | | |
|---|---|---|---|---|
| 5,162,444 | A * | 11/1992 | Himori | C08L 57/00 525/267 |
| 2017/0081447 | A1* | 3/2017 | Dossi | C08F 14/22 |
| 2023/0406974 | A1* | 12/2023 | Shibutani | C08L 53/005 |

FOREIGN PATENT DOCUMENTS

| | | | |
|---|---|---|---|
| EP | 3 459 980 A1 | 3/2019 | |
| EP | 4 209 345 A1 | 7/2023 | |
| WO | WO-2015173194 A1 * | 11/2015 | ............... C08F 14/18 |
| WO | 2017/200105 A1 | 11/2017 | |

OTHER PUBLICATIONS

International Search Report for PCT/JP2020/033655, dated Nov. 10, 2020.
Cheng Zhang, et al., "Integrating Fluorinated Polymer and Manganese-Layered Double Hydroxide Nanoparticles as pH-activated $^{19}$F MRI Agents for Specific and Sensitive Detection of Breast Cancer", Small, 2019, vol. 15, No. 1902309, pp. 1-7 (7 pages).
Cheng Zhang, et al., "High F-Content Perfluoropolyether-Based Nanoparticles for Targeted Detection of Breast Cancer by $^{19}$F Magnetic Resonance and Optical Imaging", ACS Nano, 2018, vol. 12, pp. 9162-9176 (15 pages).
Cheng Zhang, et al. "Importance of Thermally Induced Aggregation on $^{19}$F Magnetic Resonance Imaging of Perfluoropolyether-Based Comb-Shaped Poly (2-oxazoline)s", Biomacromolecules, vol. 20, No. 1, Nov. 2018, 365-374 (10 pages).
Cheng Zhang, et al. "PFPE-Based Polymeric $^{19}$F MRI Agents: A New Class of Contrast Agents with Outstanding Sensitivity", Macromolecules, vol. 50, No. 15, Jul. 2017, 5953-5963 (11 pages).
Extended European Search Report dated Aug. 2, 2023 issued by European Patent Office in Application No. 20861324.0.
International Preliminary Report on Patentability dated Mar. 8, 2022 with a Translation of the Written Opinion of the International Searching Authority in Application No. PCT/JP2020/033655.

* cited by examiner

*Primary Examiner* — Eli D. Strah
(74) *Attorney, Agent, or Firm* — Sughrue Mion, PLLC

(57) ABSTRACT

A fluorine-containing copolymer represented by formula (1) or (2):

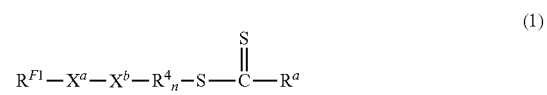

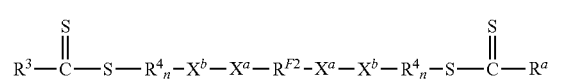

where $R^{F1}$, $X^a$, $X^b$, $R^4$, n, $R^a$ and $R^{F2}$ are as defined herein. Also disclosed is a surface-treating agent containing the fluorine-containing copolymer, a curable composition containing the fluorine-containing copolymer or surface-treating agent and a matrix forming composition, a film formed from the surface-treating agent or curable composition, and an article including a substrate and a layer formed on a surface of the substrate from the surface-treating agent or curable composition.

20 Claims, No Drawings

FLUORINE-CONTAINING COPOLYMER

CROSS-REFERENCE TO RELATED APPLICATIONS

This application is a Rule 53(b) Continuation of International Application No. PCT/JP2020/033655 filed Sep. 4, 2020, which claims priority based on Japanese Patent Application No. 2019-161528 filed Sep. 4, 2019, the respective disclosures of which are incorporated herein by reference in their entireties.

TECHNICAL FIELD

The present disclosure relates to a fluorine-containing copolymer and a surface-treating agent comprising the fluorine-containing copolymer.

BACKGROUND ART

Certain types of fluorine-containing compounds are known to be capable of providing excellent water-repellency, oil-repellency, antifouling property, and the like when used in surface treatment of a substrate. Patent Literature 1 discloses that a fluorine-containing polymer having a fluorine-containing group and a specific substituent (substituent group A in Patent Literature 1) is used for a substrate of a resin material such as a transparent plastic represented by an acrylic resin or a polycarbonate.

CITATION LIST

Patent Literature

Patent Literature 1: International Publication No. WO 2017/200105

SUMMARY

The present disclosure includes the following embodiment.

A fluorine-containing copolymer represented by the following formula (1) or (2):

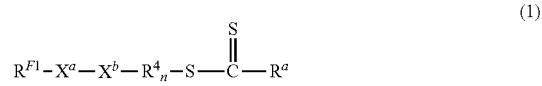

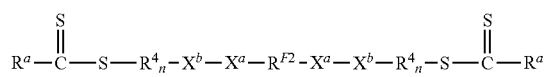

wherein
$R^{F1}$ is $Rf^1-R^F-O_q-$;
$R^{F2}$ is $-Rf^2_p-R^F-O_q-$;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is each independently a divalent fluoropolyether group;
p is 0 or 1;
q is each independently 0 or 1;
$R^4$ is each independently at each occurrence $R^{4a}$ or $R^{4b}$;
$R^{4a}$ is each independently at each occurrence a divalent organic group having a functional group selected from substituent group A;
$R^{4b}$ is each independently at each occurrence a divalent organic group not having a functional group selected from substituent group A;
the substituent group A is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof;
n is an integer of 1 to 100;
$X^a$ is each independently a divalent organic group;
$X^b$ is each independently a divalent organic group;
$R^a$ is each independently alkyl, phenyl, $-SR^{a1}$, $-OR^{a2}$, $-NR^{a3}_2$, or

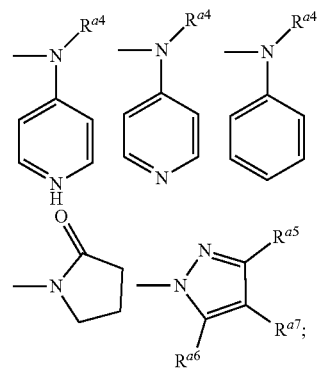

$R^{a1}, R^{a2}, R^{a3}, R^{a4}, R^{a5},$ and $R^{a6}$ are each independently an alkyl group or a phenyl group; and
$R^{a7}$ is a hydrogen atom or a halogen atom.

Advantageous Effect

The fluorine-containing copolymer of the present disclosure has high solubility in a solvent and can be suitably used as a surface-treating agent.

DESCRIPTION OF EMBODIMENTS

The "monovalent organic group", as used herein, refers to a monovalent group comprising carbon. The monovalent organic group may be a hydrocarbon group or a derivative thereof, unless otherwise specified. The derivative of hydrocarbon group refers to a group that has one or more of N, O, S, Si, amide, sulfonyl, siloxane, carbonyl, carbonyloxy, and the like at the terminal or in the molecular chain of the hydrocarbon group. The simple term "organic group" refers to a monovalent organic group. The term "divalent organic group" refers to a divalent group comprising carbon. The divalent organic group may be, but is not limited to, a divalent group obtained by further removing one hydrogen atom from an organic group.

The term "hydrocarbon group", as used herein, refers to a group that comprises carbon and hydrogen and that is obtained by removing one hydrogen atom from a hydrocarbon. The hydrocarbon group is not limited, and examples include a $C_{1-20}$ hydrocarbon group optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may comprise one or more ring structures.

The substituent of the "hydrocarbon group", as used herein, is not limited, and examples thereof include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

As used herein, unless otherwise specified, examples of the "alkyl group" include an alkyl group having 1 to 12 (preferably 1 to 6, more preferably 1 to 3, and still more preferably 1) carbon atoms (for example, a methyl group, an ethyl group, a propyl group, and an isopropyl group). Such "alkyl group" may be linear or branched, but is preferably linear. Further, the "alkyl group" may comprise a functional group.

The fluorine-containing copolymer of the present disclosure will be described in the following.

The present disclosure provides a fluorine-containing copolymer represented by the general formula (1) or (2):

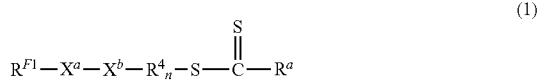

(1)

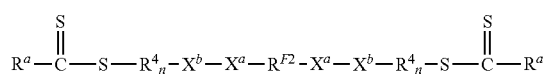

(2)

wherein
$R^{F1}$ is $Rf^1$—$R^F$—$O_q$—;
$R^{F2}$ is —$Rf^2_p$—$R^F$—$O_q$—;
$Rf^1$ is each independently a $C_{1-16}$ alkyl group optionally substituted with one or more fluorine atoms;
$Rf^2$ is a $C_{1-6}$ alkylene group optionally substituted with one or more fluorine atoms;
$R^F$ is each independently a divalent fluoropolyether group;
p is 0 or 1;
q is each independently 0 or 1;
$R^4$ is each independently at each occurrence $R^{4a}$ or $R^{4b}$;
$R^{4a}$ is each independently at each occurrence a divalent organic group having a functional group selected from substituent group A;
$R^{4b}$ is each independently at each occurrence a divalent organic group not having a functional group selected from substituent group A;
the substituent group A is a group comprising a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof;
n1 is an integer of 1 to 100;
$X^a$ is each independently a divalent organic group;
$X^b$ is each independently a divalent organic group;
$R^a$ is each independently alkyl, phenyl, —$SR^{a1}$, —$OR^{a2}$, —$NR^{a3}_2$, or

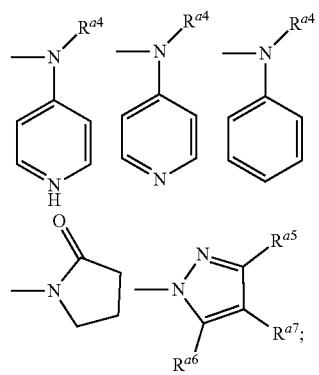

$R^{a1}$, $R^{a2}$, $R^{a3}$, $R^{a4}$, $R^{a5}$, and $R^{a6}$ are each independently an alkyl group or a phenyl group; and
$R^{a7}$ is a hydrogen atom or a halogen atom.
In the formula (1), $R^{F1}$ is $Rf^1$—$R^F$—$O_q$—.
In the formula (2), $R^{F2}$ is —$Rf^2_p$—$R^F$—$O_q$—.
In the formula, $Rf^1$ is each independently a $C_{1-16}$ alkyl group optionally substituted with one or more fluorine atoms.

In the $C_{1-16}$ alkyl group optionally substituted with one or more fluorine atoms, the "$C_{1-16}$ alkyl group" may be linear or branched, and is preferably a linear or branched $C_{1-6}$ alkyl group, in particular a linear or branched $C_{1-3}$ alkyl group, and more preferably a linear $C_{1-6}$ alkyl group, in particular a linear $C_{1-3}$ alkyl group.

$Rf^1$ is preferably a $C_{1-16}$ alkyl group substituted with one or more fluorine atoms, more preferably a $CF_2H$—$C_{1-15}$ perfluoroalkylene group, and still more preferably a $C_{1-16}$ perfluoroalkyl group.

The $C_{1-16}$ perfluoroalkyl group may be linear or branched, and is preferably a linear or branched $C_{1-6}$ perfluoroalkyl group, in particular a linear or branched $C_{1-3}$ perfluoroalkyl group, more preferably a linear $C_{1-6}$ perfluoroalkyl group, in particular a linear $C_{1-3}$ perfluoroalkyl group, and specifically —$CF_3$, —$CF_2CF_3$, or —$CF_2CF_2CF_3$.

In the formula, $Rf^2$ is a $C_{1-6}$ alkylene group optionally substituted with one or more fluorine atoms.

In the $C_{1-6}$ alkylene group optionally substituted with one or more fluorine atoms, the "$C_{1-6}$ alkylene group" may be linear or branched, and is preferably a linear or branched $C_{1-3}$ alkylene group, and more preferably a linear $C_{1-3}$ alkylene group.

The $Rf^2$ is preferably a $C_{1-6}$ alkylene group substituted with one or more fluorine atoms, more preferably a $C_{1-6}$ perfluoroalkylene group, and still more preferably a $C_{1-3}$ perfluoroalkylene group.

The $C_{1-6}$ perfluoroalkylene group may be linear or branched, and is preferably a linear or branched $C_{1-3}$ perfluoroalkylene group, more preferably a linear $C_{1-3}$ perfluoroalkyl group, and specifically —$CF_2$—, —$CF_2CF_2$—, or —$CF_2CF_2CF_2$—.

In the formula, p is 0 or 1. In one embodiment, p is 0. In another embodiment, p is 1.

In the formulas, q is each independently 0 or 1. In one embodiment, q is 0. In another embodiment, q is 1.

In the formulae (1) and (2), $R^F$ is each independently a divalent fluoropolyether group.

$R^F$ is preferably a group represented by the formula:

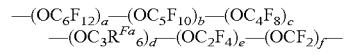

wherein
$R^{Fa}$ is each independently at each occurrence a hydrogen atom, a fluorine atom, or a chlorine atom;
a, b, c, d, e, and f are each independently an integer of 0 to 200, and the sum of a, b, c, d, e, and f is 1 or more; and the occurrence order of the respective repeating units enclosed in parentheses provided with a, b, c, d, e, or f is not limited in the formula.

$R^{Fa}$ is preferably a hydrogen atom or a fluorine atom, and more preferably a fluorine atom.

Preferably, a, b, c, d, e, and f are each independently an integer of 0 to 100.

The sum of a, b, c, d, e, and f is preferably 5 or more, and more preferably 10 or more, and may be, for example, 15 or more or 20 or more. The sum of a, b, c, d, e, and f is preferably 200 or less, more preferably 100 or less, and still more preferably 60 or less, and may be, for example, 50 or less or 30 or less.

These repeating units may be linear or branched. For example, as the repeating unit, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, or the like. —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, or the like. —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$—, and —$(OCF_2CF(C_2F_5))$—. —$(OC_3F_6)$— (where $R^{Fa}$ is a fluorine atom in the formula) may be any of —$(OCF_2CF_2CF_2)$—, —$(OCF(CF_3)CF_2)$—, and —$(OCF_2CF(CF_3))$—. —$(OC_2F_4)$— may be any of —$(OCF_2CF_2)$— and —$(OCF(CF_3))$—.

In one embodiment, the repeating unit is linear. When the repeating unit is linear, the surface lubricity, friction durability, and the like of the surface-treating layer can be improved.

In one embodiment, the repeating unit is branched. When the repeating unit is branched, the dynamic friction coefficient of the surface-treating layer can be increased.

In one embodiment, $R^F$ is each independently a group represented by any one of the following formulas (f1) to (f5):

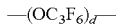     (f1)

wherein d is an integer of 1 to 200;

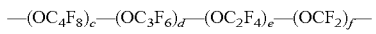     (f2)

wherein c and d are each independently an integer of 0 or more and 30 or less, and e and f are each independently an integer of 1 or more and 200 or less;
the sum of c, d, e, and f is 2 or more; and
the occurrence order of the respective repeating units enclosed in parentheses provided with a subscript c, d, e, or f is not limited in the formula;

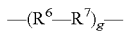     (f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or a combination of two or three groups independently selected from these groups; and
g is an integer of 2 to 100;

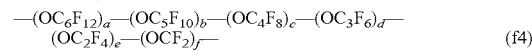     (f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and

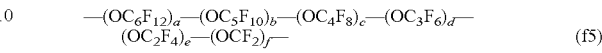     (f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

In the formula (f1), d is preferably 5 to 200, more preferably 10 to 100, and still more preferably 15 to 50, and is, for example, an integer of 25 to 35. The formula (f1) is preferably a group represented by —$(OCF_2CF_2CF_2)_d$— or —$(OCF(CF_3)CF_2)_d$—, and more preferably a group represented by —$(OCF_2CF_2CF_2)_d$—.

In the formula (f2), e and f are each independently an integer of preferably 5 or more and 200 or less, and more preferably 10 to 200. The sum of c, d, e, and f is preferably 5 or more, and more preferably 10 or more, and may be, for example, 15 or more or 20 or more. In one embodiment, the formula (f2) is preferably a group represented by —$(OCF_2CF_2CF_2CF_2)_c$—$(OCF_2CF_2CF_2)_d$—$(OCF_2CF_2)_e$—$(OCF_2)_f$—. In another embodiment, the formula (f2) may be a group represented by —$(OC_2F_4)_e$—$(OCF_2)_f$—.

In the formula (f3), $R^6$ is preferably $OC_2F_4$. In the formula (f3), $R^7$ is preferably a group selected from $OC_2F_4$, $OC_3F_6$, and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula (f3), g is an integer of preferably 3 or more, and more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably —$(OC_2F_4$—$OC_3F_6)_g$— or —$(OC_2F_4$—$OC_4F_8)_g$—.

In the formula (f4), e is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In the formula (f5), f is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

In $R^F$, the ratio of e to f (hereinafter, referred to as an "e/f ratio") is 0.1 to 10, preferably 0.2 to 5, more preferably 0.2 to 2, still more preferably 0.2 to 1.5, and further preferably 0.2 to 0.85. With an e/f ratio of 10 or less, the lubricity, friction durability, and chemical resistance (such as durability against artificial sweat) of a surface-treating layer obtained from the compound are further increased. The smaller the e/f ratio is, the higher the lubricity and the friction durability of the surface-treating layer are. On the other hand, with an e/f ratio of 0.1 or more, the stability of the compound can be further increased. The larger the e/f ratio is, the more improved the stability of the compound is.

In one embodiment, the e/f ratio is preferably 0.2 to 0.95, and more preferably 0.2 to 0.9.

In one embodiment, from the viewpoint of heat resistance, the e/f ratio is preferably 1.0 or more, and more preferably 1.0 to 2.0.

In the fluoropolyether group-containing compound, the number average molecular weight of the $R^{F1}$ and $R^{F2}$ moieties is not limited, and is, for example, 500 to 30,000, preferably 1,500 to 30,000, and more preferably 2,000 to 10,000. Herein, the number average molecular weight of $R^{F1}$ and $R^{F2}$ is defined as a value obtained by $^{19}F$-NMR measurement.

In another embodiment, the number average molecular weight of the $R^{F1}$ and $R^{F2}$ moieties is 500 to 30,000, preferably 1,000 to 20,000, more preferably 2,000 to 15,000, and further preferably 2,000 to 10,000, and may be, for example, 3,000 to 6,000.

In another embodiment, the number average molecular weight of the $R^{F1}$ and $R^{F2}$ moieties may be 4,000 to 30,000, preferably 5,000 to 10,000, and more preferably 6,000 to 10,000.

In the formulae, $R^4$ is each independently at each occurrence $R^{4a}$ or $R^{4b}$.

$R^{4a}$ is each independently at each occurrence a divalent organic group having a functional group selected from substituent group A.

Examples of substituent group A of the "functional group selected from substituent group A" include, but not limited to, a group comprising a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof.

In one embodiment, substituent group A may be an allyl group, a cinnamic acid group, a sorbic acid group, an epoxy group, a glycidyl group, an alicyclic epoxy group, an acryloyl group and a methacryloyl group (hereinafter, an acryloyl group and a methacryloyl group are collectively referred to as "(meth)acryloyl group"), a halogen atom, a vinylether(vinyloxy) group, a hydroxyl group, an oxetanyl group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, or a silane coupling group, or a precursor group thereof.

In one embodiment, substituent group A may be, for example, an epoxy group, a glycidyl group, an alicyclic epoxy group, a vinyl group, an allyl group, an optionally substituted acryloyl group, a cinnamoyl group, a 2,4-hexadienoyl group, a vinylether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, or a silane coupling group, or a precursor group thereof.

Preferable functional group selected from substituent group A depends on the material to be coated, and for example, when the material is an amorphous synthetic resin (example: acrylic resin), the "functional group selected from substituent group A" is preferably an allyl group, a cinnamic acid group, a sorbic acid group, an epoxy group, a glycidyl group, an alicyclic epoxy group, or $CH_2=CX^1-C(O)-$ (wherein $X^1$ represents a hydrogen atom, a chlorine atom, a fluorine atom, or an alkyl group having 1 to 10 carbon atoms optionally substituted with fluorine (preferably an alkyl group having 1 to 10 carbon atoms, such as a methyl group)) (example: (meth)acryloyl group), and more preferably an epoxy group, a glycidyl group, an alicyclic epoxy group, an acryloyl group, or a methacryloyl group.

The alicyclic epoxy group is preferably a group represented by the following formula:

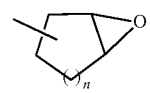

wherein n is an integer of 1 to 5.

The alicyclic epoxy group is more preferably

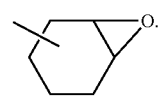

$R^{4a}$ is preferably a group represented by the following formula:

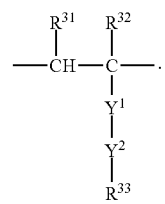

In the formula, $R^{31}$ each independently at each occurrence represents a hydrogen atom or an alkyl group. Such $R^{31}$ is preferably a hydrogen atom.

In the formula, $R^{32}$ each independently at each occurrence represents a hydrogen atom, a chlorine atom, a fluorine atom, or an alkyl group optionally substituted with fluorine. Such $R^{32}$ is preferably a methyl group or a hydrogen atom, and is more preferably a hydrogen atom.

In the formula, $R^{33}$ each independently at each occurrence represents a functional group selected from substituent group A.

The functional group selected from substituent group A is the same as described above, preferably an epoxy group, a glycidyl group, a alicyclic epoxy group or $CH_2=CX_1-C(O)-$ (wherein $X^1$ represents a hydrogen atom, a chlorine atom, a fluorine atom, or an alkyl group having 1 to 10 carbon atoms optionally substituted with fluorine (preferably an alkyl group having 1 to 10 carbon atoms, for example, a methyl group)), and specific examples thereof include an epoxy group, a glycidyl group, an alicyclic epoxy group, $CH_2=C(CH_3)-C(O)-$ or $CH_2=CH-C(O)-$.

In the formula, $Y^1$ represents a single bond, $-C(=O)O-$, $-C(=O)NH-$, $-OC(=O)-$, $-NHC(=O)-$, $-O-$, $-N(R^c)-$, phenylene or carbazolylene. Here, $R^c$ represents an organic group, and is preferably an alkyl group. These groups for $Y^1$ are bonded to C on the left side and bonded to $Y^2$ on the right side.

$Y^1$ is preferably $-C(=O)O-$, $-O-$, or carbazolylene, more preferably $-C(=O)O-$ or $-O-$, and still more preferably $-C(=O)O-$.

In the above-described formula, $Y^2$ represents a single bond or a linker having 1 to 16 atoms (more preferably 2 to 12, and still more preferably 2 to 10) in the main chain.

Examples of $Y^2$ include, but are not limited to:

—$(CH_2-CH_2-O)_{p1}$—, wherein p1 represents an integer of 1 to 10;

—$(CHR^d)_{p2}-O-$, wherein p2 is an integer of 1 to 40 and $R^d$ represents hydrogen or a methyl group;

—$(CH_2-CH_2-O)_{p3}-CO-NH-CH_2-CH_2-O-$, wherein p3 represents an integer of 1 to 10;

—$CH_2-CH_2O-CH_2-CH_2-$;

—$(CH_2)_{p4}-$, wherein p4 represents an integer of 1 to 6;

—$(CH_2)_{p5}-O-CONH-(CH_2)_{p6}-$, wherein p5 represents an integer of 1 to 8, preferably 2 or 4, and p6 represents an integer of 1 to 6, preferably 3;

—$(CH_2)_{p7}-NHC(=O)O-(CH_2)_{p8}-$, wherein p7 represents an integer of 1 to 6, preferably 3, and p8 represents an integer of 1 to 8, preferably 2 or 4; or —O—, provided that $Y^1$ is not —O—.

Preferable examples of $Y^2$ include —$(CH_2-CH_2-O)_{p1}-$, wherein p1 represents an integer of 1 to 10, or —$(CHR^d)_{p2}-O-$, wherein p2 is an integer of 1 to 40 and $R^d$ represents hydrogen or a methyl group, and specific examples thereof include —$CH_2-CH_2-O-$. In these groups, the left end is bonded to the molecular backbone side ($Y^1$ side) and the right end is bonded to the side of the functional group selected from substituent group A ($R^{33}$ side).

$R^{4a}$ is still more preferably a group represented by the following formulae:

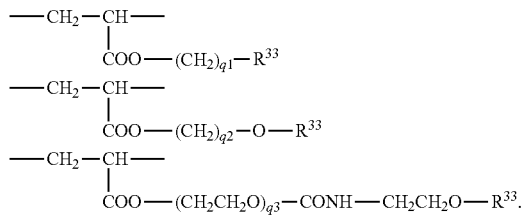

In the formulae, q1 is an integer of 1 to 10, and preferably an integer of 1 to 5 such as 1; q2 is an integer of 1 to 10, and preferably an integer of 1 to 5 such as 2; q3 is an integer of 1 to 10, and preferably an integer of 1 to 5 such as 1.

$R^{4b}$ is each independently at each occurrence a divalent organic group not having a functional group selected from substituent group A.

$R^{4b}$ is preferably —$CHR^{4c}-CR^{4d}R^{4e}-$. Here, $R^{4c}$ and $R^{4d}$ each independently represent a hydrogen atom or an alkyl group, and $R^{4e}$ group is —$Y^3-R^{4f}$. Here, $Y^3$ has the same definition as $Y^1$, $R^{4f}$ is an organic group not having a functional group selected from substituent group A, and is a group in which $R^{4g}$ group described later is bonded via a linker or directly to $Y^3$.

The linker is preferably as follows:

(a) —$(CH_2-CH_2-O)_{s1}-$, wherein s1 represents an integer of 1 to 10;

(b) —$(CHR^{4h})_{s2}-O-$, wherein s2 represents the number of repetitions, which is an integer of 1 to 40, and $R^{4h}$ represents hydrogen or a methyl group;

(c) —$(CH_2-CH_2-O)_{s1}-CO-NH-CH_2-CH_2-O-$, wherein s1 has the same definition as above;

(d) —$CH_2-CH_2O-CH_2-CH_2-$;

(e) —$(CH_2)_{s3}-$, wherein s3 represents an integer of 1 to 6; or (f) —$(CH_2)_{s4}-O-CONH-(CH_2)_{s5}-$, wherein s4 represents an integer of 1 to 8, preferably 2 or 4, and s5 represents an integer of 1 to 6, preferably 3; or (g) —O—, provided that $Y^3$ is not —O—.

$R^{4g}$ is preferably any of the following group:

(i) an alkyl group examples: methyl, ethyl, propyl, isopropyl, butyl, isobutyl, tert-butyl, pentyl, hexyl, heptyl, octyl, dodecyl, octadecyl (ii) a chain group comprising an alkyl group substituted with fluorine examples:

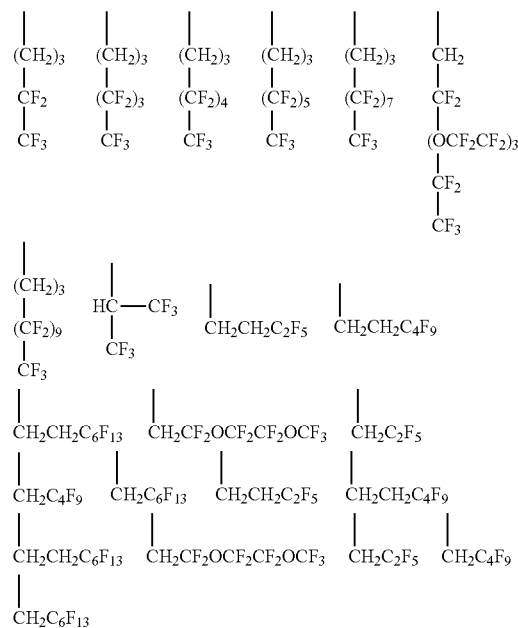

(iii) a group comprising one or more cyclic moieties selected from the group consisting of a monocyclic carbocycle, a bicyclic carbocycle, a tricyclic carbocycle and a tetracyclic carbocycle examples:

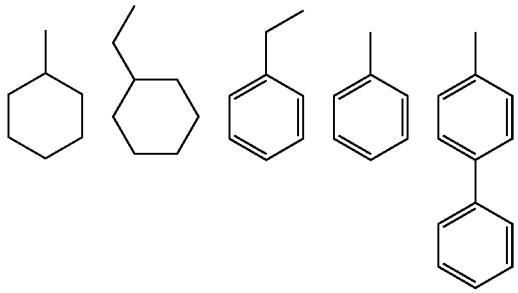

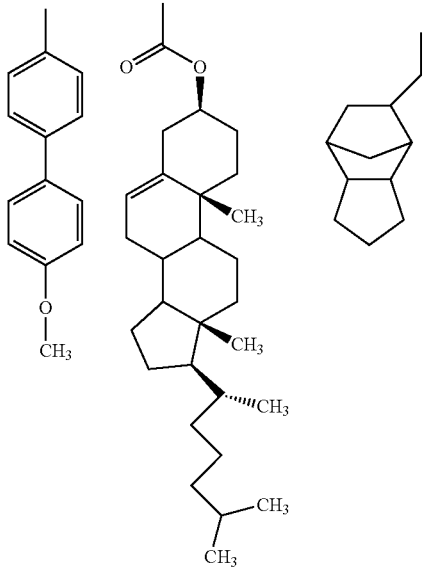

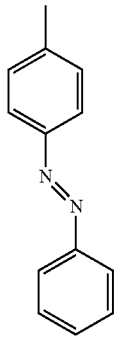

(iv) hydrogen, provided that the hydrogen atom is not bonded to the oxygen atom of the linker
(v) a group comprising an imidazolium salt
examples:

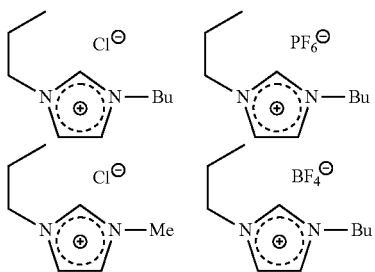

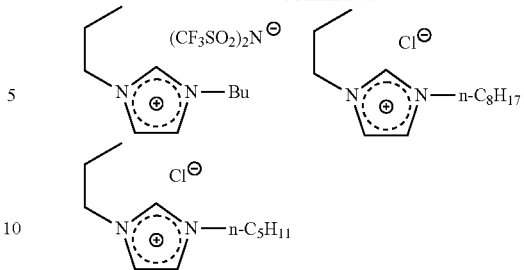

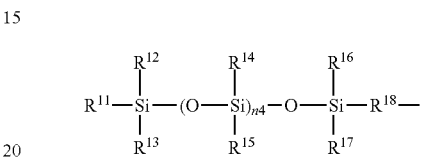

(vi) a group comprising silicon $$R^{11}-Si(R^{12})(R^{13})-(O-Si(R^{14})(R^{15}))_{n4}-O-Si(R^{16})(R^{17})-R^{18}-$$

In the formula, $R^{11}$, $R^{12}$, $R^{13}$, $R^{14}$, $R^{15}$, $R^{16}$, and $R^{17}$ are each independently an alkyl group or an aryl group.

Examples of the alkyl group include, but are not limited to, an alkyl group having 1 to 10 carbon atoms and a cycloalkyl group having 3 to 20 carbon atoms, preferably an alkyl group having 1 to 6 carbon atoms, and specific examples thereof include a n-butyl group for $R^{11}$ and a methyl group for $R^{12}$ to $R^{17}$.

Examples of the aryl group include, but are not limited to, an aryl group having 6 to 20 carbon atoms. Such an aryl group may comprise 2 or more rings. A preferable aryl group is a phenyl group.

The above-described alkyl group and aryl group may comprise a heteroatom such as a nitrogen atom, an oxygen atom and a sulfur atom in their molecular chain or ring, if desired.

Furthermore, the alkyl group and aryl group may be substituted with one or more substituents selected from a halogen atom; and a $C_{1-6}$ alkyl group, a $C_{2-6}$ alkenyl group, a $C_{2-6}$ alkynyl group, a $C_{3-10}$ cycloalkyl group, an unsaturated $C_{3-10}$ cycloalkyl group, a 5 to 10-membered heterocyclyl group, an unsaturated 5 to 10-membered heterocyclyl group, a $C_{6-10}$ aryl group and a 5 to 10-membered heteroaryl group, all of which are optionally substituted with one or more halogen atoms, if desired.

In the formula, $R^{18}$ represents a divalent organic group. Such $R^{18}$ is preferably —$(CH_2)_{r''}$—, wherein r'' is an integer of 1 or more and 20 or less, preferably an integer of 1 or more and 10 or less, and is more preferably —$(CH_2)_{r''}$—, wherein r'' is an integer of 1 or more and 10 or less.

In the formula, n4 is each independently an integer of 1 or more and 500 or less. n4 is preferably an integer of 1 or more and 200 or less, and more preferably 10 or more and 200 or less.

$R^{4g}$ is more preferably a hydrogen atom (excluding hydrogen bonded to O to form a hydroxyl group) or an alkyl group that may be fluorinated and bonded via an ethylene chain or an oxyethylene chain; more preferably a hydrogen atom, a methoxyethyl group, an isobutyl group or $R^{4i}$—$CF_2$—$(CF_2)_{s6}$—$(CH_2)_{s7}$—O—$(CH_2)_2$—, wherein $R^{4i}$ is a fluorine atom or a hydrogen atom, s6 is an integer of 0 to 6, and s7 is an integer of 1 to 6; and still more preferably a 3-(perfluoroethyl) propoxyethyl group [rational formula: $CF_3$—$(CF_2)$—$((CH_2)_3$—O—$(CH_2)_2$—].

In $R^4$, the structural unit $R^{4a}$ and the structural unit $R^{4b}$ may each form a block or may be bonded randomly.

In one embodiment, in $R^4$, the structural unit $R^{4a}$ and the structural unit $R^{4b}$ each form a block.

In one embodiment, in $R^4$, the structural unit $R^{4a}$ and the structural unit $R^{4b}$ are bonded randomly.

In one embodiment, $R^4$ is $R^{4a}$. That is, $R^4$ consists of a structural unit $R^{4a}$ having a functional group selected from substituent group A.

In a preferred embodiment, the number of $R^{4a}$ (polymerization degree) is 1 to 100, preferably 2 to 70, more preferably 2 to 50, and still more preferably 2 to 30.

In one embodiment, $R^4$ is $R^{4b}$. That is, $R^4$ consists of a structural unit $R^{4b}$ not having a functional group selected from substituent group A.

In a preferred embodiment, the number of $R^{4b}$ (polymerization degree) is 1 to 100, preferably 2 to 70, more preferably 2 to 50, and still more preferably 2 to 30.

In the formula, n is an integer of 1 to 100, preferably an integer of 2 to 70, more preferably an integer of 2 to 50, and still more preferably an integer of 2 to 30.

In the formula, $X^a$ is each independently a divalent organic group.

In the formula, $X^b$ is each independently a divalent organic group.

In the formula, $—X^a—X^b—$ is understood to be a part of a linker connecting $R^{F1}$ and $R^4$ in the fluorine-containing copolymer represented by the formula (1) or (2). Accordingly, $X^a$ and $X^b$ may be any divalent organic group as long as a compound represented by the formulae (1) and (2) can stably exist.

In one embodiment, $X^a$ may each independently be a group represented by the following formula:

$$-(Q)_e-(CFZ)_f-(CH_2)_g-$$

wherein e, f, and g each independently represent an integer of 0 to 10 and the sum of e, f, and g is 1 or more, the respective repeating units enclosed in parentheses may be present in any order.

In the formula, Q each independently at each occurrence represents an oxygen atom, phenylene, carbazolylene, $—NR^q—$ (wherein $R^{q1}$ represents a hydrogen atom or an organic group) or a divalent polar group. Preferably, Q represents an oxygen atom or a divalent polar group.

Examples of the "divalent polar group" represented by Q include, but not limited to, $—C(O)—$, $—C(=NR^b)—$ and $—C(O)NR^{q2}—$, wherein $R^{q2}$ represents a hydrogen atom or a lower alkyl group. The "lower alkyl group" is, for example, an alkyl group having 1 to 6 carbon atoms, such as methyl, ethyl and n-propyl, which are optionally substituted with one or more fluorine atoms.

In the formulae, Z each independently at each occurrence represents a hydrogen atom, a fluorine atom or a lower fluoroalkyl group, and preferably a fluorine atom. The "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or pentafluoroethyl group, and still more preferably a trifluoromethyl group.

$X^a$ is preferably a group represented by the following formula:

$$—(O)_e—(CF_2)_f—(CH_2)_g—$$

wherein e, f, and g have the same definition as above, and the occurrence order of the respective repeating units enclosed in parentheses is not limited in the formula.

Herein, a left end of these groups is bonded to $R^{F1}$.

In one embodiment, $X^a$ may be a group represented by $$—(O)_{e1}—(CH_2)_{g2}—O—[(CH_2)_{g3}—O—]_{g4}, \text{ or}$$

$$—(O)_{e1}—(CF_2)_{f2}—(CH_2)_{g2}—O—[(CH_2)_{g3}—O—]_{g4},$$

wherein e1 is 0 or 1;

f2, g2, and g3 are each independently an integer of 1 to 10; and g4 is 0 or 1.

Herein, a left end of these groups is bonded to $R^{F1}$.

In a preferred embodiment, $X^a$ may be a group represented by $$—(CH_2)_{g2}—O—,$$

wherein g2 is an integer of 1 to 10.

Herein, a left end of such a group is bonded to $R^{F1}$.

In the formula, $X^b$ is each independently a divalent organic group.

In one embodiment, $X^b$ may be a group represented by the following formula:

$$—CO—R^{b3}—CR^{b1}R^{b2}—$$

wherein $R^{b1}$ and $R^{b2}$ are each independently a hydrogen atom, a $C_{1-3}$ alkyl group, a phenyl group, or $—CN$; and $R^{b3}$ is a single bond or an optionally substituted $C_{1-6}$ alkylene group.

Herein, a right end of such a group is bonded to $R^4$.

$R^{b1}$ and $R^{b2}$ are each independently preferably a $C_{1-3}$ alkyl group, a phenyl group, or $—CN$, more preferably a $C_{1-3}$ alkyl group or $—CN$. The $C_{1-3}$ alkyl group is preferably a methyl group or an ethyl group, and more preferably a methyl group.

In one embodiment, $R^{b1}$ is a $C_{1-3}$ alkyl group, preferably a methyl group, and $R^{b2}$ is a hydrogen atom or $—CN$.

The substituent in the "optionally substituted $C_{1-6}$ alkylene group" of $R^{b3}$ is preferably a $C_{1-3}$ alkyl group or a phenyl group, and preferably a $C_{1-3}$ alkyl group. The $C_{1-3}$ alkyl group is preferably a methyl group or an ethyl group, and more preferably a methyl group. The number of the substituents may be one or two or more.

The $C_{1-6}$ alkylene group of $R^{b3}$ may preferably be a $C_{1-3}$ alkylene group, more preferably a $C_{2-3}$ alkylene group, such as a dimethylene group.

In one embodiment, $R^{b3}$ is a single bond.

In another embodiment, $R^{b3}$ is an optionally substituted $C_{1-6}$ alkylene group, preferably a $C_{1-6}$ alkylene group.

In the formula, $R^a$ is alkyl, phenyl, $—SR^{a1}$, $—OR^{a2}$, $—NR^{a3}{}_2$, or

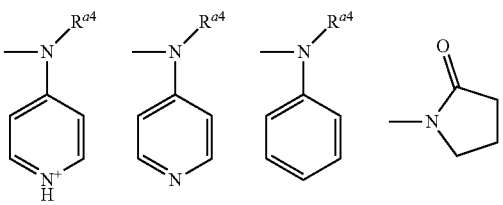

-continued

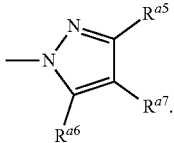

R<sup>a</sup> may be part of a so-called RAFT agent.

In the formula, $R^{a1}$, $R^{a2}$, $R^{a3}$, $R^{a4}$, $R^{a5}$, and $R^{a6}$ are each independently an alkyl group or a phenyl group.

$R^{a1}$ is preferably a $C_{1-20}$ alkyl group, more preferably a $C_{3-18}$ alkyl group, and still more preferably a $C_{4-12}$ alkyl group.

$R^{a2}$ is preferably phenyl group or a $C_{1-20}$ alkyl group. The $C_{1-20}$ alkyl group is preferably a $C_{1-10}$ alkyl group, more preferably a $C_{1-6}$ alkyl group, and still more preferably a $C_{1-3}$ alkyl group.

$R^{a3}$ is preferably a $C_{1-20}$ alkyl group, more preferably a $C_{1-10}$ alkyl group, still more preferably a $C_{1-6}$ alkyl group, and further preferably a $C_{1-3}$ alkyl group.

$R^{a4}$ is preferably a $C_{1-6}$ alkyl group, more preferably a $C_{1-3}$ alkyl group, and still more preferably a methyl group.

$R^{a5}$ is preferably a $C_{1-6}$ alkyl group, more preferably a $C_{1-3}$ alkyl group, and still more preferably a methyl group.

$R^{a6}$ is preferably a $C_{1-6}$ alkyl group, more preferably a $C_{1-3}$ alkyl group, and still more preferably a methyl group.

$R^{a7}$ is a hydrogen atom or a halogen atom, (such as fluorine, chlorine, bromine or iodine, preferably chlorine).

In one embodiment, $R^{a}$ is —$SR^{a1}$ or —$OR^{a2}$.

In a preferred embodiment, the fluorine-containing copolymer of the present disclosure may be a fluorine-containing copolymer represented by the formula (1).

The number average molecular weight of the fluorine-containing copolymer of the present disclosure may be, but not limited to, $2\times10^2$ to $1\times10^5$, preferably $1\times10^3$ to $5\times10^4$, and more preferably $3\times10^3$ to $2\times10^4$. When the number average molecular weight is within such a range, the solubility in a solvent and the contact angle of the surface-treating layer can be further increased. The number average molecular weight can be determined by gel permeation chromatography (GPC).

The polydispersity (weight average molecular weight (Mw)/number average molecular weight (Mn)) of the fluorine-containing copolymer of the present disclosure may preferably be 3.0 or less, more preferably 2.5 or less, still more preferably 2.0 or less, and further preferably 1.5 or less. By reducing the polydispersity, a more homogeneous surface-treating layer can be formed, and the durability of the surface-treating layer can be improved.

The fluorine-containing polymer of the present disclosure can be synthesized by utilizing, for example, so-called reversible addition-fragmentation chain transfer (RAFT) type radical polymerization.

First, a RAFT agent having a perfluoropolyether group is prepared. For example, a compound (A) having a perfluoropolyether and a compound (B1) or (B2) having a RAFT skeleton (—SC(=S)—):

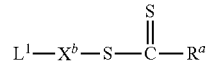 (A)

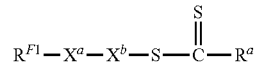 (B1)

(B2)

wherein $R^{a}$, $R^{F1}$, $R^{F2}$, $X^{a}$, and $X^{b}$ have the same definition as above; and each one of $L^{1}$ and $L^{2}$ is a moiety to be removed, may be reacted to obtain a chain transfer agent (1a) or (2a) having a perfluoropolyether group:

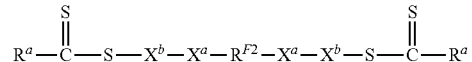 (1a)

(2a)

wherein $R^{a}$, $R^{F1}$, $R^{F2}$, $X^{a}$, and $X^{b}$ have the same definition as above.

The chain transfer agent (1a) or (2a) obtained as described above may be reacted with a monomer having an unsaturated bond to obtain the compound represented by the formula (1) or (2). Such a reaction is so-called RAFT polymerization, and as the reaction condition, conditions generally used in RAFT polymerization can be used.

Next, a surface-treating agent comprising the fluorine-containing copolymer represented by the general formulas (1) and (2) will be described.

The fluorine-containing copolymers of the present disclosure are preferably used to treat the surface of substrates made of various materials including resins. That is, the present disclosure provides a surface-treating agent comprising one or more fluorine-containing copolymers represented by the formulas (1) and (2).

The surface-treating agent of the present disclosure may further comprise at least one fluorine-containing oil represented by the following general formula (C):

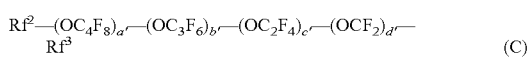

(C)

(hereinafter, also referred to as "fluorine-containing oil (C)").

In the formula (C), $R^{f2}$ represents an alkyl group having 1 to 16 carbon atoms optionally substituted with one or more fluorine atoms, and $R^{f3}$ represents a hydrogen atom, a fluorine atom, or an alkyl group having 1 to 16 carbon atoms optionally substituted with one or more fluorine atoms. Preferably, $R^{f2}$ and $R^{f3}$ are each independently an alkyl group having 1 to 3 carbon atoms optionally substituted with one or more fluorine atoms, and more preferably a perfluoroalkyl group having 1 to 3 carbon atoms.

In the formula (C), a', b', c' and d' represent the respective three numbers of repeating units in perfluoro(poly)ether constituting a main backbone of the polymer and are mutually independently an integer of 0 or more and 300 or less, preferably an integer of 0 or more and 200 or less, and the sum of a', b', c' and d' is at least 1, preferably 1 to, 300. The occurrence order of the respective repeating units in parentheses with the subscript a', b', c' or d' is not limited in the formula. Among such repeating units, —($OC_4F_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))— and is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)— and —(OCF$_2$CF(CF$_3$))— and is preferably —(OCF$_2$CF$_2$CF$_2$)—, and —(OC$_2$F$_4$)— may be any of —(OCF$_2$CF$_2$)— and —(OCF(CF$_3$))— and is preferably —(OCF$_2$CF$_2$)—.

Examples of the fluorine-containing oil represented by the general formula (C) include compounds represented by any one of the following general formulae (C1) and (C2) (which may be one or a mixture of two or more kinds thereof):

$$\text{Rf}^2\text{—}(\text{OCF}_2\text{CF}_2\text{CF}_2)_{b''}\text{—Rf}^3 \quad (C1)$$

wherein Rf$^2$ and Rf$^3$ are as described above, b" is an integer of 0 to 300, and the occurrence order of the respective repeating units enclosed in parentheses provided with a subscript b" is not limited in the formula;

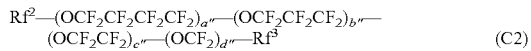

$$\text{Rf}^2\text{—}(\text{OCF}_2\text{CF}_2\text{CF}_2\text{CF}_2)_{a''}\text{—}(\text{OCF}_2\text{CF}_2\text{CF}_2)_{b''}\text{—}(\text{OCF}_2\text{CF}_2)_{c''}\text{—}(\text{OCF}_2)_{d''}\text{—Rf}^3 \quad (C2)$$

wherein Rf$^2$ and Rf$^3$ are as described above, a" and b" are each independently an integer of 0 to 30, c" and d" are each independently an integer of 0 to 300, and the occurrence order of the respective repeating units enclosed in parentheses provided with a subscript a", b", c", or d" is not limited in the formula.

The fluorine-containing oil (C) may have an average molecular weight of about 1,000 to 30,000. Accordingly, high surface lubricity can be obtained.

In the surface-treating agent of the present disclosure, the fluorine-containing oil (C) may be contained in an amount of, for example, 0 to 80 parts by mass and preferably 0 to 40 parts by mass based on total 100 parts by mass of the fluorine-containing copolymer (in the case of two or more, the total thereof, and the same also applies below).

In the surface-treating agent of the present disclosure, the fluorine-containing oil (C) may be contained in an amount of preferably 40% by mass or less based on the total of the fluorine-containing copolymer and the fluorine-containing oil (C).

The fluorine-containing oil (C) contributes to increasing the surface lubricity of the surface-treating layer.

In addition to the components described above, the surface-treating agent of the present disclosure may comprise other components such as a silicone oil, an active energy ray radical curing initiator, a thermal acid generator, and an active energy ray cationic curing initiator.

For example, the silicone oil may be a linear or cyclic silicone oil having 2,000 or less siloxane bonds. The linear silicone oil may be so-called a straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with polyether, higher fatty acid ester, fluoroalkyl, amino, epoxy, carboxyl, alcohol, or the like. Examples of the cyclic silicone oil include cyclic dimethylsiloxane oil.

In the surface-treating agent of the present disclosure, the silicone oil may be contained in an amount of, for example, 0 to 50 parts by mass and preferably 0 to 10 parts by mass based on total 100 parts by mass of the fluorine-containing copolymer (in the case of two or more, the total thereof, and the same also applies below).

As the active energy ray radical curing initiator, for example, those which generate radicals upon irradiation with electromagnetic waves in a wavelength region of 350 nm or less, such as ultraviolet rays, electron beams, X-rays, γ-rays, or the like, and function as a catalyst that initiates curing (crosslinking reaction) of a curable site (for example, carbon-carbon double bond) of a fluorine-containing copolymer having the curable site as a functional group selected from substituent group A, and usually generate radicals with ultraviolet rays are used.

The active energy ray radical curing initiator in the surface-treating agent of the present disclosure is appropriately selected depending on the type of curable site in the fluorine-containing copolymer, the type of active energy ray to be used (wavelength range or the like), irradiation intensity, or the like, and generally, the following can be exemplified as the initiator for curing the fluorine-containing copolymer having the radical-reactive curable site (carbon-carbon double bond) using the active energy ray in the ultraviolet region.

Acetophenones
  acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropane-1-one, and the like.
Benzoins
  benzoin, benzoin methyl ether, benzoin ethyl ether, benzoin isopropyl ether, benzoin isobutyl ether, benzyl dimethyl ketal, and the like.
Benzophenones
  benzophenone, benzoylbenzoic acid, methyl benzoylbenzoate, 4-phenylbenzophenone, hydroxybenzophenone, hydroxy-propylbenzophenone, acrylated benzophenone, Michler's ketone and the like.
Thioxanones
  thioxanthone, chlorothioxanthone, methylthioxanthone, diethylthioxanthone, dimethylthioxanthone, and the like.
Others
  benzyl, α-acyloxime ester, acylphosphine oxide, glyoxyester, 3-ketocoumarin, 2-ethylanthraquinone, camphorquinone, anthraquinone, and the like.

These active energy ray curing initiator may be used singly or in combination of two or more kinds thereof.

The active energy ray curing initiator is not particularly limited, and is contained in an amount of 0.01 to 1,000 parts by mass, preferably 0.1 to 500 parts by mass, based on 100 parts by mass of the total of the fluorine-containing copolymer and, if present, the fluorine-containing oil (C).

By using the thermal acid generator, decomposition reaction of the compound containing a cationic species is caused by heat, and curing (crosslinking reaction) of the curable site (for example, cyclic ethers) of the fluorine-containing copolymer having the curable site is initiated.

The thermal acid generator is preferably, for example, a compound represented by the following general formula (a):

$$(R^1_a R^2_b R^3_c R^4_d Z)^{+m}(AXn)^{-m} \quad (a)$$

wherein Z represents at least one element selected from the group consisting of S, Se, Te, P, As, Sb, Bi, O, N and halogen elements; R$^1$, R$^2$, R$^3$, and R$^4$ are the same or different and represent an organic group; a, b, c and d are 0 or a positive number, and the total of a, b, c, and d is equal to the valence of Z; the cation $(R^1_a R^2_b R^3_c R^4_d Z)^{+m}$ represents an onium salt; A represents a metal element or a metalloid element which is a central atom of the halide complex, and is at least one selected from the group consisting of B, P, As, Al, Ca, In, Ti, Zn, Sc, V, Cr, Mn, and Co; X represents a halogen element; m is the net charge of the halide complex ion; and n is the number of halogen elements in the halide complex ion.

Specific examples of the anion $(AXn)^{-m}$ of the general formula (a) include tetrafluoroborate $(BF_4^-)$, hexafluorophosphate $(PF_6^-)$, hexafluoroantimonate $(SbF_6^-)$, hexafluoroarsenate $(AsF_6^-)$, and hexachloroantimonate $(SbCl_6^-)$.

Further, anions represented by the general formula AXn $(OH)^-$ can also be used. Examples of other anions include perchlorate ion $(ClO_4^-)$, trifluoromethylsulfite ion $(CF_3SO_3^-)$, fluorosulfonate ion $(FSO_3^-)$, toluenesulfonate ion, and trinitrobenzenesulfonate ion.

Specific examples of commercial products of the thermal acid generator include: diazonium salts such as AMERI-CURE series (manufactured by American Can Company), ULTRASE T series (manufactured by Adeka Corporation), and WPAG series (manufactured by Wako Pure Chemical Company); iodonium salts such as UVE series (manufactured by General Electric Company), FC series (manufactured by 3M), UV9310C (manufactured by GE Toshiba Silicones Ltd.), Photoinitiator 2074 (manufactured by Rhone-Poulenc), and WPI series (manufactured by Wako Pure Chemical Company); and sulfonium salts such as CYRACURE series (manufactured by Union Carbide Corporation), UVI series (manufactured by General Electric Company), FC series (manufactured by 3M), CD series (manufactured by Sartomer), Optomer SP series and Optmer CP series (manufactured by Adeka Corporation), San Aid SI series (manufactured by Sanshin Chemical Industry Co., Ltd.), CI series (manufactured by Nippon Soda Co., Ltd.), WPAG series (manufactured by Wako Pure Chemical Company), and CPI series (manufactured by San-Apro Ltd.), and are not limited to these.

These thermal acid generators may be used singly or in combination of two or more kinds thereof.

The thermal acid generator is not limited, and is contained in an amount of 0.01 to 1,000 parts by mass, preferably 0.1 to 500 parts by mass, based on 100 parts by mass of the total of the fluorine-containing copolymer and, if present, the fluorine-containing oil (C).

By using the active energy ray cationic curing initiator, a compound containing a cationic species is excited by light to cause a photodecomposition reaction, thereby initiating curing (crosslinking reaction) of the curable site (for example, cyclic ethers) of the fluorine-containing copolymer having the curable site.

Suitable examples of the active energy ray cationic curing initiator include triphenylsulfonium hexafluoroantimonate, triphenylsulfonium phosphate, p-(phenylthio)phenyldiphenylsulfonium hexafluoroantimonate, p-(phenylthio)phenyldiphenylsulfonium hexafluorophosphate, 4-chlorophenyldiphenylsulfonium hexafluorophosphate, 4-chlorophenyldiphenylsulfonium hexafluoroantimonate, bis[4-(diphenylsulfonio)phenyl]sulfide bishexafluorophosphate, bis[4-(diphenylsulfonio)phenyl]sulfide bishexafluoroantimonate, (2,4-cyclopentadien-1-yl) [(1-methylethyl)benzene]-Fe-hexafluorophosphate, and diaryliodonium hexafluoroantimonate.

Specific examples of commercial products of the active energy ray cationic curing initiator preferably include diazonium salt, iodonium salt, and sulfonium salt products such as UVI-6950, UVI-6970, UVI-6974, and UVI-6990 (manufactured by Union Carbide Corporation); Adeca Optomer SP-150, SP-151, SP-170, and SP-172 (manufactured by ADEKA CORPORATION); Irgacure 250 (manufactured by Ciba Japan); CI-2481, CI-2624, CI-2639, and CI-2064 (manufactured by Nippon Soda Co., Ltd.); CD-1010, CD-1011, and CD-1012 (manufactured by Sartomer Company Inc.); DTS-102, DTS-103, NAT-103, NDS-103, TPS-103, MDS-103, MPI-103, and BBI-103 (manufactured by Midori Kagaku Co., Ltd.); PCI-061T, PCI-062T, PCI-020T, and PCI-022T (manufactured by Nippon Kayaku Co., Ltd.); CPI-100P, CPT-101A, and CPI-200K (manufactured by San-Apro Ltd.); San-Aid SI-60L, San-Aid SI-80L, San-Aid SI-100L, San-Aid ST-110L, San-Aid SI-145, San-Aid SI-150, San-Aid SI-160, and San-Aid SI-180L (manufactured by Sanshin Chemical Industry Co., Ltd.); and WPAG series (manufactured by Wako Pure Chemical Industries, Ltd.).

These active energy ray cationic curing initiator may be used singly or in combination of two or more kinds thereof.

The active energy ray radical curing initiator is not limited, and is contained in an amount of 0.01 to 1,000 parts by mass, preferably 0.1 to 500 parts by mass, based on 100 parts by mass of the total of the fluorine-containing copolymer and, if present, the fluorine-containing oil (C).

The surface-treating agent of the present disclosure may contain a solvent. Since the fluorine-containing copolymer contained in the surface-treating agent of the present disclosure exhibits high solubility not only in a fluorine-containing organic solvent but also in a fluorine-free organic solvent which is a general-purpose solvent, a fluorine-containing organic solvent and a fluorine-free organic solvent can be used as the solvent.

Examples of such a fluorine-containing organic solvent include perfluorohexane, perfluorooctane, perfluorodimethyl cyclohexane, perfluorodecalin, perfluoroalkyl ethanol, perfluorobenzene, perfluorotoluene, perfluoroalkyl amine (for example, Fluorinert (trade name)), perfluoroalkyl ether, perfluorobutyl tetrahydrofuran, polyfluoroaliphatic hydrocarbons (for example, ASAHIKLIN AC6000 (trade name)), hydrochlorofluorocarbons (for example, ASAHIKLIN AK-225 (trade name)), hydrofluoroether (for example, Novec (trade name), HFE-7100 (trade name)), 1,1,2,2,3,3,4-heptafluorocyclopentane, fluorine-containing alcohols, perfluoroalkyl bromide, perfluoroalkyl iodide, perfluoropolyether (for example, Krytox (trade name), Demnum (trade name), Fomblin (trade name)), 1,3-bistrifluoromethylbenzene, 2-(perfluoroalkyl)ethyl methacrylate, 2-(perfluoroalkyl)ethyl acrylate, perfluoroalkyl ethylene, chlorofluorocarbon 134a, and hexafluoropropene oligomers.

Examples of such a fluorine-free organic solvent include acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, 2-butanone, acetonitrile, benzonitrile, butanol, 1-propanol, 2-propanol, ethanol, methanol, and diacetone alcohol.

Among them, the solvent used in the surface-treating agent of the present disclosure is preferably, methyl isobutyl ketone, propylene glycol monomethyl ether, hexadecane, butyl acetate, acetone, 2-butanone, cyclohexanone, ethyl acetate, diacetone alcohol or 2-propanol.

These solvents may be used singly or in combination of two or more kinds thereof.

Such a solvent is contained in an amount of 5 to 100,000 parts by mass, preferably 5 to 50,000 parts by mass, based on 100 parts by mass of the total of the fluorine-containing copolymer and, if present, the fluorine-containing oil (C).

In one embodiment, the surface-treating agent of the present disclosure can be added to a matrix forming composition to form a curable composition.

The curable composition comprises the fluorine-containing copolymer or the surface-treating agent of the present disclosure in an amount of 0.01 to 20% by mass, preferably 0.01 to 10% by mass, and more preferably 0.1 to 10% by mass.

The matrix forming composition means a composition comprising a compound having at least one carbon-carbon double bond, for example, a compound which is monofunctional and/or polyfunctional acrylate and methacrylate (hereinafter, acrylate and methacrylate are collectively referred to as "(meth)acrylate"), monofunctional and/or polyfunctional urethane (meth)acrylate, or monofunctional and/or polyfunctional epoxy (meth)acrylate, although not limited thereto. Examples of the matrix forming composition include, but not limited to, a composition generally used as a hard coating agent or an antireflection agent, for example, a hard coating agent comprising a polyfunctional (meth)acrylate or an antireflection agent comprising a fluorine-containing (meth)acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The antireflection agent is commercially available, for example, as Optool AR-110 (trade name) from Daikin Industries, Ltd.

The matrix forming composition is also preferably a composition comprising a compound which is a monofunctional and/or polyfunctional epoxy. For example, epoxy resins such as bisphenol A diglycidyl ether, 2,2'-bis(4-glycidyloxycyclohexyl)propane, 3,4-epoxycyclohexylmethyl-3,4-epoxycyclohexanecarboxylate, vinylcyclohexenedioxide, 2-(3,4-epoxycyclohexyl)-5,5-spiro-(3,4-epoxycyclohexane)-1,3-dioxane, bis(3,4-epoxycyclohexyl)adipate, 1,2-cyclopropanedicarboxylic acid bisglycidyl ester, and triglycidyl isocyanurate can be used.

Also usable are hydrogenated epoxy resins, alicyclic epoxy resins, epoxy resins containing isocyanurate rings, bisphenol A type epoxy resins, bisphenol F type epoxy resins, phenol novolac type epoxy resins, cresol novolac type epoxy resins, naphthalene type epoxy resins, biphenyl type epoxy resins, phenol aralkyl type epoxy resins, biphenyl aralkyl type epoxy resins, hydrogenated epoxy resins obtained by hydrogenating aromatic rings of the various epoxy resins and dicyclopentadiene type epoxy resins.

The surface-treating agent and the curable composition of the present disclosure may further contain any of additives such as antioxidants, thickening agents, leveling agents, antifoaming agents, antistatic agents, antifogging agents, ultraviolet absorbers, pigments, dyes, inorganic fine particles such as silica, fillers such as aluminum paste, talc, glass frit, and metal powder, and polymerization inhibitors such as butylated hydroxytoluene (BHT) and phenothiazine (PTZ).

Next, an article of the present disclosure will be described.

The present disclosure provides an article comprising a substrate and a layer (surface-treating layer) formed on a surface of the substrate from the surface-treating agent or curable composition of the present disclosure (hereinafter, the surface-treating agent or curable composition of the present disclosure is collectively referred to as a "surface-treating agent" or a "surface-treating composition"). The article can be produced, for example, as follows.

First, a substrate is provided. The substrate usable in the present disclosure may be composed of any suitable material such as a glass, a resin (may be a natural or synthetic resin such as a common plastic material, preferably polycarbonate resins, poly(meth)acrylate resins, polyethylene terephthalate resins, triacetyl cellulose resins, polyimide resins, modified (transparent) polyimide resins, polycycloolefin resins, and polyethylene naphthalate resins; and may be in form of a plate, a film, or others), a metal (may be a simple substance of a metal such as aluminum, copper, silver, or iron, or a complex such as alloy or the like), ceramics, a semiconductor (silicon, germanium, or the like), a fiber (a fabric, a non-woven fabric, or the like), a fur, a leather, a wood, a pottery, a stone, an architectural member or the like.

For example, when the article to be produced is an optical member, the material constituting the surface of the substrate may be a material for an optical member, such as glass or a transparent plastic. The substrate, according to its specific specifications or the like, may have an insulating layer, an adhesive layer, a protecting layer, a decorated frame layer (I-CON), an atomizing film layer, a hard coating layer, a polarizing film, a phase difference film, an organic EL display module, a liquid crystal display module, or the like.

For example, when the article to be produced is an insulating member or a dielectric member, the material constituting the surface of the substrate may be an electronic or electrical material such as phenol resin, epoxy resin, polyimide, polyphenylene ether, liquid crystal polymer, fluororesin, or a composite material thereof such as paper phenol or glass cloth impregnated epoxy, or a metal material such as copper or aluminum, or an inorganic material such as alumina or glass.

The shape of the substrate is not limited. The surface region of the substrate on which a surface-treating layer is to be formed may be at least a part of the substrate surface, and may be suitably determined according to the application, specific specifications, and the like of an article to be produced.

Then, a film of the surface-treating agent of the present disclosure is formed on the surface of the substrate, then this film is post-treated as necessary, and thereby a surface-treating layer is formed from the surface-treating agent of the present disclosure.

The film of the surface-treating agent of the present disclosure can be formed by applying the surface-treating agent on the surface of the substrate such that the composition coats the surface. The coating method is not limited. For example, a wet coating method can be used.

Examples of the wet coating method include dip coating, spin coating, flow coating, spray coating, roll coating, gravure coating, micro-gravure coating, bar coating, die coating, screen printing, and similar methods.

When using the wet coating method, the surface-treating agent of the present disclosure can be applied to the substrate surface after being diluted with a solvent. The fluorine-containing organic solvent and fluorine-free organic solvent described above can be used as the solvent. From the viewpoint of the stability of the surface-treating agent and the volatility of the solvent of the present disclosure, the following solvent is preferably used: a perfluoroaliphatic hydrocarbon having 5 to 12 carbon atoms (for example, perfluorohexane, perfluoromethylcyclohexane, and perfluoro-1,3-dimethylcyclohexane); polyfluoroaromatic hydrocarbons (for example, bis(trifluoromethyl)benzene);

polyfluoroaliphatic hydrocarbon; cellosolve solvents such as hydrofluoroether (HFE) (for example, alkyl perfluoroalkyl ethers such as perfluoropropyl methyl ether ($C_3F_7OCH_3$), perfluorobutyl methyl ether ($C_4F_9OCH_3$), perfluorobutyl ethyl ether ($C_4F_9OC_2H_5$), perfluorohexyl methyl ether ($C_2F_5CF(OCH_3)C_3F_7$) (perfluoroalkyl group and alkyl group may be linear or branched)), hydrochlorofluorocarbon (for example, ASAHIKLIN AK-225 (trade name)), methyl cellosolve, ethyl cellosolve, methyl cellosolve acetate, and ethyl cellosolve acetate; ester solvents such as diethyl oxalate, ethyl pyruvate, ethyl-2-hydroxybutyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketone solvents such as acetone, methyl ethyl ketone, methyl isobutyl ketone, 2-hexanone, cyclohexanone, methyl amino ketone, and 2-heptanone; alcohol solvents such as methanol, ethanol, propanol, isopropanol, butanol, and diacetone alcohol; and aromatic hydrocarbons such as toluene and xylene. One of these solvents can be used singly, or two or more can be used as a mixture. Among them, hydrofluoroether, glycol solvents, ester solvents, ketone solvents, and alcohol solvents are preferable, and perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl ethyl ketone, methyl isobutyl ketone, isopropanol, butanol, and diacetone alcohol are particularly preferable.

The film is then post-treated. This post-treatment is not limited, but is performed, for example, by irradiating active energy rays, for example, electromagnetic waves in a wavelength region of 350 nm or less, such as ultraviolet rays, electron beams, X-rays, γ-rays, and the like. Alternatively, it is performed by heating for a predetermined time. By performing such post-treatment, curing of the curable site of the fluorine-containing copolymer having the curable site and, if present, the curable site of the hard coating agent is initiated, and bonds are formed between these compounds and between these compounds and the substrate.

In the above-described manner, a surface-treating layer derived from the surface-treating agent of the present disclosure is formed on the substrate surface, and the article of the present disclosure is produced. The surface-treating layer thus obtained has both high surface lubricity (or lubricity, such as wiping property for fouling including fingerprints and the like and excellent tactile sensations to the fingers) and high friction durability. Further, this surface-treating layer may have not only high friction durability and surface lubricity but also have, depending on the formulation of the surface-treating agent used, water-repellency, oil-repellency, antifouling properties (for example, preventing grime such as fingerprints from adhering), and the like, and may be suitably used as a functional thin film.

That is, the present disclosure further relates to an optical material having the surface-treating layer in the outermost layer.

The optical material preferably includes a wide variety of optical materials in addition to optical materials relating to displays and the like as exemplified below: for example, displays such as cathode ray tubes (CRTs; for example, TV, PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on films or their surfaces.

The article having a surface-treating layer obtained according to the present disclosure may be, but is not limited to, an optical member. Examples of the optical member include lenses of glasses or the like; front surface protective plates, anti-scattering films, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; and optical fibers.

In one embodiment, examples of the article having the surface-treating layer obtained by the present disclosure include a light detection and ranging (LiDAR) cover member, a sensor member, an instrument panel cover member, an automobile interior member, and the like, and in particular, these members for automobiles.

The thickness of the surface-treating layer is not limited. The thickness of the surface-treating layer in the case of an optical member is in the range of 0.1 to 30 µm, preferably 0.5 to 20 µm, from the viewpoint of optical performance, surface lubricity, friction durability, and antifouling property.

Further, since the fluorine-containing copolymer of the present disclosure contains fluorine, it can be used as an insulator or a dielectric having excellent electrical characteristics.

That is, the present disclosure further relates to an insulator and a dielectric formed from the curable composition.

The insulator and the dielectric may form a film. That is, the insulator and the dielectric are suitably used as an insulating film and a dielectric film. The insulating film can be used as a gate insulating film, an interlayer insulating film, a semiconductor insulating film such as an insulating film formed after resist stripping and cleaning, an insulating film laminated on a printed wiring board, an insulating film of a ceramic wiring board, a film capacitor, an insulating film for signal wire (for example, an electric wire) covering material, or the like.

The insulating film or the dielectric film can be used as a dielectric insulating layer of a high-frequency transmission line. An example of the high-frequency transmission line is a millimeter wave radar substrate for automatic operation. Since the insulating film or the dielectric film contains fluorine and has a low dielectric tangent tan S and a low dielectric constant, the sensitivity of the on-vehicle radar can be improved.

The insulating film can be used as an insulator of a high-speed communication compatible substrate. The transmission loss can be reduced by reducing the dielectric constant or dielectric tangent, as understood from the following equation which represents the transmission loss of a high-frequency electrical signal.

---

Dielectric (insulator) loss $\propto f \times \sqrt{Dk} \times Df$ f: frequency (Hz)
Dk: Dielectric constant
Df: Dielectric tangent

---

The insulating film of the present disclosure is advantageous as an insulator for a high-speed communication compatible substrate because of the low dielectric constant and dielectric tangent due to the effect of fluorine.

Examples of such high-speed communication compatible substrates include a base station antenna substrate, an antenna distribution substrate, a substrate for remote radio head (RRH) which is a radio part of a radio base station, a substrate for a control unit or a baseband unit (BBU) of a radio base station, a transceiver substrate for high-speed communication, a substrate for radio network controller (RNC), a substrate for a high-speed transmitter, a substrate for a high-speed receiver, a substrate for a high-speed signal multiplex circuit, a substrate for WiFig used in the 60 GHz band, a substrate for data transfer used in a server for a data center, and the like.

In addition, examples of the high-speed communication compatible substrate include an antenna substrate, for example, a substrate for a massive multi-element antenna (Massive MIMO) for large-capacity communication required by a standard after 5G.

The insulating film can be used not only as an insulator for a substrate but also as an insulator for a signal wire covering material. For example, the insulating film can be used as insulation covering materials (example; insulating tube) of waveguides that transmit high-speed signals, QSFP cables for high-speed LANs, high-speed communication compatible coaxial cables (example; SFP+cables, QSFP+cables), and low-loss coaxial cables.

When such a high frequency is used, electrical characteristics such as a stably low dielectric constant (εr) and a low dielectric tangent (tan δ) are required for materials used in electrical components such as connectors and communication devices such as casings. The insulating film can also be used as an insulating material for such materials.

The insulating film can also be used as an insulating material for a connector printed wiring board requiring soldering. Since the insulator has excellent heat resistance, problems are hardly caused even at high temperatures during soldering.

In dielectric waveguides, materials with low dielectric loss are required in order to transmit high-frequency millimeter waves or sub-millimeter waves with low loss. The dielectric film can also be used as an insulating material for a dielectric waveguide that transmits millimeter waves, sub-millimeter waves, and the like. Examples of the dielectric waveguides include cylindrical dielectric waveguides, rectangular dielectric waveguides, elliptical dielectric waveguides, tubular dielectric waveguides, image guides, insular-image guides, trapped image guides, rib guides, strip dielectric waveguides, inverted strip dielectric waveguides, H guides, and nonradiative dielectric waveguides (NRD guides).

The component in which the insulating film or the dielectric film of the present disclosure is used may be any component as long as insulating properties are required, and examples thereof include electronic components, various components for touch panels, solar cell panels, and displays. Specific examples of the component include a semiconductor, a printed circuit board, an element sealing material, and an element protective film.

The article obtained by using the surface-treating agent of the present disclosure has been described in detail above. The application of the surface-treating agent of the present disclosure, the method of use thereof, the method of producing the article, and the like are not limited to those exemplified above.

The present disclosure includes the following embodiments.

[1] A fluorine-containing copolymer represented by the following formula (1) or (2):

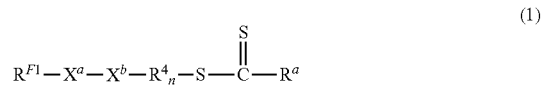

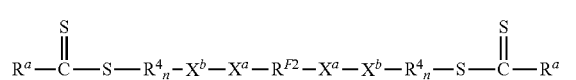

wherein
$R^{F1}$ is $Rf^1$—$R^F$—$O_q$—;
$R^{F2}$ is —$Rf^2_p$—$R^F$—$O_q$—;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is each independently a divalent fluoropolyether group;
p is 0 or 1;
q is each independently 0 or 1;
$R^4$ is each independently at each occurrence $R^{4a}$ or $R^{4b}$;
$R^{4a}$ is each independently at each occurrence a divalent organic group having a functional group selected from substituent group A;
$R^{4b}$ is each independently at each occurrence a divalent organic group not having a functional group selected from substituent group A;
the substituent group A is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof;
n is an integer of 1 to 100;
$X^a$ is each independently a divalent organic group;
$X^b$ is each independently a divalent organic group;
$R^a$ is each independently alkyl, phenyl, —$SR^{a1}$, —$OR^{a2}$, —$NR^{a3}_2$, or

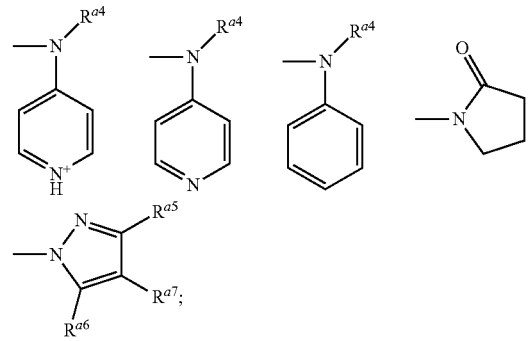

$R^{a1}$, $R^{a2}$, $R^{a3}$, $R^{a4}$, $R^{a5}$, and $R^{a6}$ are each independently an alkyl group or a phenyl group; and
$R^{a7}$ is a hydrogen atom or a halogen atom.

[2] The fluorine-containing copolymer according to [1], wherein $R^F$ is each independently a group represented by the formula:

$$-(OC_6F_{12})_a-(OC_5F_{10})_b-(OC_4F_8)_c-(OC_3R^{Fa}{}_6)_d-(OC_2F_4)_e-(OCF_2)_f-$$

wherein $R^{Fa}$ is each independently at each occurrence a hydrogen atom, a fluorine atom, or a chlorine atom; and
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

[3] The fluorine-containing copolymer according to [2], wherein $R^{Fa}$ is a fluorine atom.

[4] The fluorine-containing copolymer according to any one of [1] to [3], wherein $R^F$ is each independently a group represented by the following formula (f1), (f2), (f3), (f4), or (f5):

$$-(OC_3F_6)_d- \qquad (f1)$$

wherein d is an integer of 1 to 200;

$$-(OC_4F_8)_c-(OC_3F_6)_d-(OC_2F_4)_e-(OCF_2)_f- \qquad (f2)$$

wherein c and d are each independently an integer of 0 to 30;
e and f are each independently an integer of 1 to 200;
the sum of c, d, e, and f is an integer of 10 to 200; and
the occurrence order of the respective repeating units enclosed in parentheses provided with a subscript c, d, e, or f is not limited in the formula;

$$-(R^6-R^7)_g- \qquad (f3)$$

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or is a combination of two or three groups selected from these groups; and
g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \qquad (f4)$$

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and $$-(OC_6F_{12})_a-(OC_5F_{10})_b-(OC_4F_8)_c-(OC_3F_6)_d-(OC_2F_4)_e-(OCF_2)_f- \qquad (f5)$$

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

[5] The fluorine-containing copolymer according to any one of [1] to [4], wherein $R^4$ is $R^{4a}$.

[6] The fluorine-containing copolymer according to any one of [1] to [5], wherein $R^{4a}$ is a group represented by the following formula:

$$\begin{array}{c} R^{31} \quad R^{32} \\ | \quad\quad | \\ -CH-C- \\ | \\ Y^1 \\ | \\ Y^2 \\ | \\ R^{33} \end{array}$$

wherein
$R^{31}$ is each independently at each occurrence a hydrogen atom or an alkyl group;
$R^{32}$ is each independently at each occurrence a hydrogen atom, a chlorine atom, a fluorine atom, or an alkyl group optionally substituted with fluorine;
$R^{33}$ is each independently at each occurrence a functional group selected from substituent group A;
$Y^1$ is a single bond, $-C(=O)O-$, $-C(=O)NH-$, $-OC(=O)-$, $-NHC(=O)-$, $-O-$, $-N(R^c)-$, phenylene or carbazolylene;
$R^c$ is an organic group; and
$Y^2$ is a single bond or a linker having 1 to 16 atoms in the main chain.

[7] The fluorine-containing copolymer according to any one of [1] to [6], wherein the functional group selected from substituent group A of $R^{4a}$ is a group having an epoxy group, a glycidyl group, an alicyclic epoxy group, an acryloyl group, or a methacryloyl group.

[8] The fluorine-containing copolymer according to any one of [1] to [7], wherein n is an integer of 2 to 50.

[9] The fluorine-containing copolymer according to any one of [1] to [8], wherein n is an integer of 2 to 30.

[10] A surface-treating agent comprising one or more fluorine-containing copolymers according to any one of [1] to [9].

[11] A curable composition comprising:
the fluorine-containing copolymer according to any one of [1] to [9] or the surface-treating agent according to [10]; and
a matrix forming composition.

[12] A film formed from the surface-treating agent according to [10] or the curable composition according to [11].

[13] An article comprising:
a substrate; and
a layer formed on a surface of the substrate from the surface-treating agent according to [10] or the curable composition according to [11].

[14] The article according to [13], wherein the article is an optical member.

[15] The article according to [13], which is a LiDAR cover member.

[16] The article according to [13], which is a sensor member.

[17] The article according to [13], which is an instrument panel cover member.

[18] The article according to [13], which is an automobile interior member.

[19] The article according to [13], wherein the article is an insulator or a dielectric.

EXAMPLES

Hereinafter, the present disclosure will be described by way of Examples, but the present disclosure is not intended to be limited to the following Examples. In the Examples, all chemical formulae shown below indicate average compositional features, and the occurrence order of repeating units (such as ($OCF_2CF_2CF_2$), ($OCF_2CF_2$), and ($OCF_2$)) constituting perfluoropolyether is not limited.

1. Synthesis of Perfluoropolyether-Containing Chain Transfer Agent

Synthesis Example 1

Synthesis of Chain Transfer Agent (A-1)
To a flask were added 0.505 g of 2-[(dodecylsulfanylthiocarbonyl)sulfanyl] propanoic acid (manufactured by FUJI- FILM Wako Pure Chemical Corporation), 0.019 g of 4-dimethylaminopyridine (DMAP) (manufactured by Tokyo Chemical Industry Co., Ltd.), 0.293 g of 1-ethyl-3-(3-dimethylaminopropyl) carbodiimide hydrochloride (EDCI) (manufactured by Tokyo Chemical Industry Co., Ltd.), and 5.0 g of an alcohol containing perfluoropolyether represented by $CF_3CF_2CF_2(OCF_2CF_2CF_2)_nOCF_2CF_2CH_2OH$ (average value of n≈25) (manufactured by Daikin Industries, Ltd.), and 13 mL of ASAHIKLIN AK-225 (manufactured by AGC) was then added and stirred at room temperature to conduct the reaction. After stirring overnight, the reaction solution was washed with saturated aqueous sodium bicarbonate and brine. The organic layer was separated, concentrated, and dropped into methanol to give 4.56 g of a yellow oily target product (A-1), which was a dehydration condensation reaction product of 2-[(dodecylsulfanylthiocarbonyl)sulfanyl] propanoic acid with an alcohol containing a perfluoropolyether. The structure of the compound was confirmed by $^1H$ and $^{19}F$ NMR measurements.

Synthesis Example 2

Synthesis of Chain Transfer Agent (A-2)

In the same manner as in Synthesis Example 1, 4.28 g of the target product (A-2) was obtained, except that 0.505 g of 2-[(dodecylsulfanylthiocarbonyl)sulfanyl] propanoic acid was changed to 0.343 g of 2-[(butylsulfanylthiocarbonyl)sulfanyl] propanoic acid (synthesized with reference to Macromolecules, 2005, 38, 2191-2204).

Synthesis Example 3

Synthesis of Chain Transfer Agent (A-3)

In the same manner as in Synthesis Example 1, 4.20 g of the target product (A-3) was obtained, except that 0.505 g of 2-[(dodecylsulfanylthiocarbonyl)sulfanyl] propanoic acid was changed to 0.356 g of 4-cyano-4-[(thioethoxyl)sulfanyl] pentanoic acid (synthesized with reference to Tetrahedron Letters, 1999, 40, 277-280).

Synthesis Example 4

Synthesis of Chain Transfer Agent (A-4)

In the same manner as in Synthesis Example 1, 2.59 g of the target product (A-4) was obtained, except that 3.1 g of $CF_3CF_2CF_2(OCF_2CF_2CF_2)_nOCF_2CF_2CH_2OH$ (average value of n≈14) was used as the alcohol containing a perfluoropolyether.

Synthesis Example 5

Synthesis of Chain Transfer Agent (A-5)

In the same manner as in Synthesis Example 1, 4.27 g of the target product (A-5) was obtained, except that the amount of 2-[(dodecylsulfanylthiocarbonyl)sulfanyl] propanoic acid was changed to 0.421 g, DMAP to 0.015 g, and EDCI to 0.230 g and 4.2 g of $CF_3CF_2(OCF_2)_m(OCF_2CF_2)_nOCF_2CH_2OH$ (number average molecular weight 4200, n/m=1.1) was used as the alcohol containing a perfluoropolyether.

Synthesis Example 6

Synthesis of Chain Transfer Agent (A-6)

In the same manner as in Synthesis Example 1, 4.68 g of the target product (A-6) was obtained, except that 5.0 g of $CF_3CF_2CF_2[OCF(CF_3)CF_2]_nOCF(CF_3)CH_2OH$ (average value of n≈25) was used as the alcohol containing a perfluoropolyether.

Synthesis of Chain Transfer Agent (A-7)

In the same manner as in Synthesis Example 1, 7.70 g of the target product (A-7) was obtained, except that 8.1 g of $CF_3CF_2CF_2(OCF_2CF_2CF_2)_nOCF_2CF_2CH_2OH$ (average value of n≈35) was used as the alcohol containing a perfluoropolyether.

2. Synthesis of PFPE Block Polymers Having an Epoxy Group (1) Synthesis of PFPE Block Polymers (P-1) to (P-6) Having an Epoxy Group Into a reaction vessel, 1.0 g of a chain transfer agent (A-1), 0.92 g of 4-hydroxybutylacrylate glycidyl ether (4HBAGE) (manufactured by Mitsubishi Chemical Corporation), and 12 mg of N,N'-azobisisobutyronitrile (AIBN) (manufactured by FUJIFILM Wako Pure Chemical Corporation) were added, and the mixture was dissolved in 2.9 mL of 1,3-bis(trifluoromethyl)benzene (manufactured by Tokyo Chemical Industry Co., Ltd.). The mixture was heated at 75° C. for 17 hours, and the reaction solution was added dropwise to hexane to precipitate and recover a block polymer (P-1). From $^1H$-NMR measurements, the polymerization degree of 4HBAGE was calculated to be 20.

In the same manner as described above, block polymers (P-2) to (P-6) having polymerization degrees of 10, 5, 30, 3, and 105 were synthesized by changing the charging amount of 4HBAGE to 0.46 g, 0.23 g, 1.40 g, 0.14 g, and 4.83 g as shown in Table 1.

(2) Synthesis of PFPE Block Polymer (P-7) Having an Epoxy Group

Polymerization was carried out in the same manner as in the synthesis of P-1 except that 1.0 g of the chain transfer agent (A-1) was changed to 1.0 g of the chain transfer agent (A-2), thereby obtaining a block polymer (P-7) having a polymerization degree of 20.

(3) Synthesis of PFPE Block Polymer (P-8) Having an Epoxy Group

Polymerization was carried out in the same manner as in the synthesis of P-1 except that 1.0 g of the chain transfer agent (A-1) was changed to 1.0 g of the chain transfer agent (A-3), thereby obtaining a block polymer (P-8) having a polymerization degree of 20.

(4) Synthesis of PFPE Block Polymer (P-9) Having an Epoxy Group

Polymerization was carried out in the same manner as in the synthesis of P-1 except that 1.0 g of the chain transfer agent (A-1) was changed to 0.62 g of the chain transfer agent (A-4) and the charging amount of 4HBAGE was changed to 0.46 g, thereby obtaining a block polymer (P-9) having a polymerization degree of 10.

(5) Synthesis of PFPE Block Polymer (P-10) Having an Epoxy Group

Polymerization was carried out in the same manner as in the synthesis of P-1 except that 1.0 g of the chain transfer agent (A-1) was changed to 1.0 g of the chain transfer agent (A-5), thereby obtaining a block polymer (P-10) having a polymerization degree of 20.

(6) Synthesis of PFPE Block Polymer (P-11) Having an Epoxy Group

Polymerization was carried out in the same manner as in the synthesis of P-1 except that 1.0 g of the chain transfer agent (A-1) was changed to 1.0 g of the chain transfer agent (A-6), thereby obtaining a block polymer (P-11) having a polymerization degree of 20.

3. Synthesis of PFPE Block Polymers without Crosslinkable Groups

Polymerization was carried out in the same manner as in the synthesis of P-1 except that 4HBAGE was changed to 0.59 g of n-butyl acrylate (nBA), and methanol was used in precipitating the polymer, thereby obtaining a block polymer (P-12) having a polymerization degree of 20.

4. Synthesis of PFPE Block Polymers Having a (meth)acryloyl Group (1) Synthesis of PFPE Block Polymers (P-15) and (P-16) Having an Acryloyl Group Into a reaction vessel, 1.3 g of the chain transfer agent (A-1), 0.18 g of 2-hydroxyethylacrylate (HEA) (manufactured by Tokyo Chemical Industry Co., Ltd.) and 15.5 mg of AIBN were added and dissolved in 2.1 mL of 1,3-bis(trifluoromethyl)benzene. Polymerization was carried out by heating at 70° C. for 22.5 hours to obtain a solution of a block polymer (P-13). From $^1$H-NMR measurements, the polymerization degree of HEA was calculated to be 5.

In the same manner, the charging amount of HEA was changed to 0.36 g, and a block polymer (P-14) having a polymerization degree of 10 was synthesized as shown in the table.

Subsequently, 1.1 equivalents of Karenz AOI (manufactured by Showa Denko K.K.) and 0.01 equivalents of dibutyltin dilaurate (DBTDL) (manufactured by Tokyo Chemical Industry Co., Ltd.) with respect to the HEA unit in the polymer (P-13) were added to the block polymer (P-13) solution obtained above, and the mixture was stirred at 40° C. for 2 hours. After it was confirmed by $^1$H-NMR measurement that 100% of the hydroxyl groups had reacted, the reacted solution was added dropwise to hexane to precipitate and recover a block polymer (P-15) having an acrylic group.

The same reaction was carried out for the block polymer (P-14) to synthesize a block polymer (P-16) having a different polymerization degree.

(2) Synthesis of PFPE Block Polymers (P-17) and (P-18) Having a Methacryloyl Group Block polymers (P-17) and (P-18) having a methacryloyl group were synthesized in the same manner as in the synthesis of P-15 and P-16 except that Karenz AOI was changed to Karenz MOI (manufactured by Showa Denko K.K.) as shown in the table.

(3) Synthesis of PFPE Block Polymers (P-21) and (P-22) Having an Acryloyl Group

Into a reaction vessel, 1.2 g of (A-1), 0.20 g of 4-hydroxybutylacrylate (HBA) (manufactured by Tokyo Chemical Industry Co., Ltd.), and 14.0 mg of AIBN were added and dissolved in 2.1 mL of 1,3-bis(trifluoromethyl)benzene. Polymerization was carried out by heating at 70° C. for 22.5 hours to obtain a solution of a block polymer (P-19). From $^1$H-NMR measurements, the polymerization degree of HBA was calculated to be 5.

In the same manner, the charging amount of HBA was changed to 0.40 g, and a block polymer (P-20) having a polymerization degree of 10 was synthesized as shown in the table.

Subsequently, 1.1 equivalents of Karenz AOI (manufactured by Showa Denko K.K.) and 0.01 equivalents of dibutyltin dilaurate (DBTDL) (manufactured by Tokyo Chemical Industry Co., Ltd.) with respect to the HBA unit in the polymer (P-19) were added to the block polymer (P-19) solution obtained above, and the mixture was stirred at 40° C. for 2 hours. After it was confirmed by $^1$H-NMR measurement that 100% of the hydroxyl groups had reacted, the reacted solution was added dropwise to hexane to precipitate and recover a block polymer (P-21) having an acrylic group.

The same reaction was carried out for the block polymer (P-20) to synthesize a block polymer (P-22) having a different polymerization degree.

(4) Synthesis of PFPE Block Polymers (P-23) and (P-24) Having an Acryloyl Group

Block polymers (P-23) and (P-24) having a methacryloyl group were synthesized in the same manner as in the synthesis of P-19 and P-20 except that Karenz AOI was changed to Karenz MOI (manufactured by Showa Denko K.K.) as shown in the table.

(5) Synthesis of PFPE Block Polymers (P-25) Having an Methacryloyl Group

A block polymer (P-25) shown below was synthesized with reference to Example 45 of Japanese Patent No. 5840236.

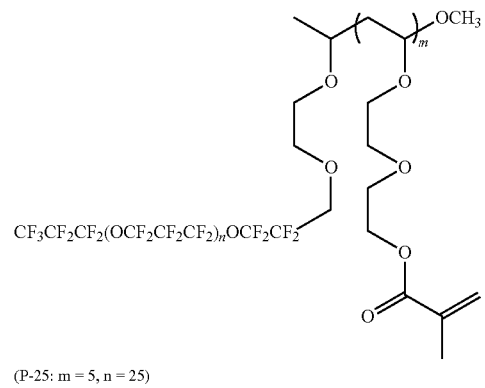

(P-25: m = 5, n = 25)

(6) Synthesis of PFPE Block Polymers (P-26) Having an Acryloyl Group

A block polymer (P-26) shown below was synthesized by changing the monomer 2-(vinyloxy)ethoxyethyl methacrylate of Example 45 of Japanese Patent No. 5840236 to 2-(vinyloxy)ethoxyethyl acrylate (manufactured by NIPPON SHOKUBAI CO., LTD.).

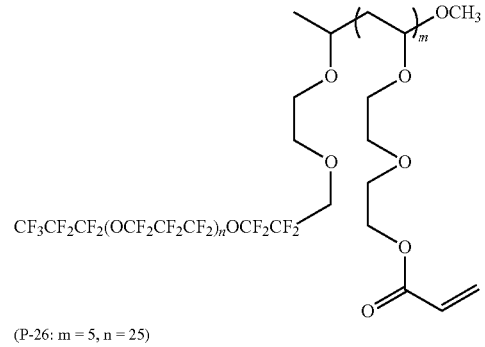

(P-26: m = 5, n = 25)

Synthesis of PFPE Block Polymers (P-27) to (P-29) Having an Epoxy Group

Into a reaction vessel, 0.9 g of the chain transfer agent (A-7), 0.43 g of 4HBAGE, and 7 mg of AIBN were added and dissolved in 3.0 mL of 1,3-bis(trifluoromethyl)benzene. The mixture was heated at 75° C. for 17 hours, and the reaction solution was added dropwise to hexane to precipitate and recover a block polymer (P-27). From $^1$H-NMR measurements, the polymerization degree of 4HBAGE was calculated to be 17.

In the same manner as described above, block polymers (P-28) and (P-29) having polymerization degrees of 10 and 7 were synthesized by changing the charging amount of 4HBAGE to 0.28 g and 0.22 g as shown in Table 1.

Synthesis of PFPE Block Polymers (P-30) and (P-31) Having an Alicyclic Epoxy Group Polymerization was carried out in the same manner as in the synthesis of P-1 except that 0.92 g of 4HBAGE was changed to 0.76 g of (3,4-epoxycyclohexyl)methyl acrylate (ECHMA) (manufactured by Tokyo Chemical Industry Co., Ltd.) to obtain a block polymer (P-30) having a polymerization degree of 20. Polymerization was carried out in the same manner as in the synthesis of P-30 except that the charging amount of ECHMA was changed to 0.38 g, thereby obtaining a block polymer (P-31) having a polymerization degree of 10.

(Evaluation)
5. Solubility Test

The above obtained polymers (P-1) to (P-12), (P-15) to (P-18), and (P-21) to (P-31) were added to methyl isobutyl ketone (MIBK) or methyl ethyl ketone (MEK) at a solid concentration of 20 wt %, dissolved by stirring with a mix rotor for 2 hours, and the solution state was visually confirmed. The evaluation criteria were as follows. The results are shown in Table 1 below.

G Transparent and uniform dissolution was observed.
NG Turbidity was observed.

6. Coating Preparation
(1) Acrylic Coating

An acrylic hard coat agent Beam set 575CB (manufactured by Arakawa Chemical Industry Co., Ltd.) was dissolved in MIBK, and the block polymers (P-1) to (P-12), (P-15) to (P-18), and (P-21) to (P-31) were added to the solution so that the concentration of the block polymers relative to the solid of the hard coat agent resin was 1% in terms of the solid content, thereby obtaining a PFPE-containing hard coat agent of 50% by mass.

A commercially available PET substrate (Lumirror S10, manufactured by Toray Industries, Inc.) was coated with the PFPE-containing hard coat agent by bar coater, dried at 70° C. for 10 minutes, and then irradiated with ultraviolet light to obtain a cured film. A belt conveyor type ultraviolet irradiation device was used for the ultraviolet irradiation, and the dose was set to 600 mJ/cm$^2$.

(2) Epoxy Coating

CELLOXIDE 2021P (manufactured by Daicel Corporation) was dissolved in MIBK, and the block polymers (P-1) to (P-12), (P-15) to (P-18), and (P-21) to (P-31) were added to the solution so that the concentration of the block polymers relative to the solid of the epoxy compound was 1% in terms of the solid content, thereby preparing an epoxy compound solution of 50% by mass. Furthermore, a thermal acid generator, San-Aid SI-60L (manufactured by Sanshin Chemical Industry Co., Ltd.) was added in an amount of 3 wt % based on the epoxy compound to obtain a PFPE-containing treatment agent.

A PET substrate was coated with the PFPE-containing treatment agent using a bar coater and heated at 90° C. for 2 hours to obtain a cured film.

7. Contact Angle Evaluation

The static contact angle of water of the cured film produced in the coating film production step was measured using 2 µL of liquid using a contact angle meter ("DropMaster" manufactured by Kyowa Interface Science Co., Ltd.). The results are shown in Table 1 below.

TABLE 1

| Fluorine-containing copolymer | Chain transfer agent | Monomer | Polymerization degree | Solubility MIBK | Solubility MEK | Water contact angle acrylic | Water contact angle epoxy |
|---|---|---|---|---|---|---|---|
| P-1 | A-1 | 4HBAGE | 20 | G | G | 96 | 98 |
| P-2 | A-1 | 4HBAGE | 10 | G | G | 101 | 100 |
| P-3 | A-1 | 4HBAGE | 5 | G | G | 109 | 113 |
| P-4 | A-1 | 4HBAGE | 30 | G | G | 93 | 93 |
| P-5 | A-1 | 4HBAGE | 3 | G | G | 110 | 112 |
| P-6* | A-1 | 4HBAGE | 105 | G | G | <90 | <90 |
| P-7 | A-2 | 4HBAGE | 20 | G | G | 99 | 101 |
| P-8 | A-3 | 4HBAGE | 20 | G | G | 98 | 99 |
| P-9 | A-4 | 4HBAGE | 10 | G | G | 95 | 96 |
| P-10 | A-5 | 4HBAGE | 20 | G | G | 99 | 100 |
| P-11 | A-6 | 4HBAGE | 20 | G | G | 97 | 99 |
| P-12 | A-1 | nBA | 20 | G | G | 95 | 98 |
| P-13 | A-1 | HEA | 5 | — | — | — | — |
| P-14 | A-1 | HEA | 10 | — | — | — | — |
| P-15 | A-1 | AOI-modified HEA | 5 | G | G | 106 | 109 |
| P-16 | A-1 | AOI-modified HEA | 10 | G | G | 101 | 103 |
| P-17 | A-1 | MOI-modified HEA | 5 | G | G | 106 | 110 |
| P-18 | A-1 | MOI-modified HEA | 10 | G | G | 100 | 101 |
| P-19 | A-1 | HBA | 5 | — | — | — | — |
| P-20 | A-1 | HBA | 10 | — | — | — | — |
| P-21 | A-1 | AOI-modified HBA | 5 | G | G | 109 | 111 |
| P-22 | A-1 | AOI-modified HBA | 10 | G | G | 99 | 100 |
| P-23 | A-1 | MOI-modified HBA | 5 | G | G | 107 | 111 |

TABLE 1-continued

| Fluorine-containing copolymer | Chain transfer agent | Monomer | Polymerization degree | Solubility MIBK | Solubility MEK | Water contact angle acrylic | Water contact angle epoxy |
|---|---|---|---|---|---|---|---|
| P-24 | A-1 | MOI-modified HBA | 10 | G | G | 98 | 100 |
| P-25* | — | | 5 | NG | NG | 106 | 107 |
| P-26* | — | | 5 | NG | NG | 106 | 106 |
| P-27 | A-7 | 4HBAGE | 17 | G | G | 98 | 99 |
| P-28 | A-7 | 4HBAGE | 10 | G | G | 105 | 105 |
| P-29 | A-7 | 4HBAGE | 7 | G | G | 106 | 108 |
| P-30 | A-1 | ECHMA | 20 | G | G | 98 | 100 |
| P-31 | A-1 | ECHMA | 10 | G | G | 104 | 106 |

*indicates Comparative Examples.

8. Measurement of Dielectric Constant and Dielectric Tangent

EXAMPLE

One part by weight of the block polymer (P-1) and 10 parts by weight of CELLOXIDE 2021P (manufactured by Daicel Corporation) were uniformly dissolved in 8 parts by weight of MEK. Furthermore, a thermal acid generator, San-Aid SI-60L (manufactured by Sanshin Chemical Industry Co., Ltd.) was added in an amount of 3 wt % based on the epoxy compound to obtain a coating agent.

A PET substrate was coated with the PFPE-containing treatment agent using a bar coater and heated at 90° C. for 2 hours to obtain a cured film having a thickness of about 50 μm.

A cured film having a thickness of about 50 μm was obtained in the same manner except that only the block polymer (P-1) was changed to the block polymers P-2, P-9, P-11, P-12, P-27, and P-30.

The dielectric constant and dielectric tangent at 10 GHz were obtained by the split-cylinder resonator method. A resonator manufactured by KANTO Electronic Application and Development Inc. was used as a split cylinder, and Keysight N5290A was used as a network spectrum analyzer. As a sample to be measured, a film having a thickness of 50 μm×a width of 62 mm×a length of 75 mm was used. The measurement temperature was set to be 25° C. The results are shown in Table 2.

COMPARATIVE EXAMPLE

A cured film (Comparative Example) having a thickness of 50 μm was prepared in the same manner as above Example excepting only the block polymer (P-1), and the dielectric constant and dielectric tangent were measured in the same manner. The results are shown in Table 2.

TABLE 2

| | Fluorine-containing polymer | Dielectric constant | Dielectric tangent |
|---|---|---|---|
| Example | P-1 | 3.2 | 0.020 |
| | P-2 | 3.1 | 0.019 |
| | P-9 | 3.3 | 0.020 |
| | P-10 | 3.3 | 0.021 |

TABLE 2-continued

| | Fluorine-containing polymer | Dielectric constant | Dielectric tangent |
|---|---|---|---|
| | P-11 | 3.2 | 0.020 |
| | P-27 | 3.0 | 0.017 |
| | P-30 | 3.2 | 0.021 |
| Comparative Example | none | 3.4 | 0.025 |

From the above results, it was confirmed that the fluorine-containing copolymer (P-1 to P-5, P-7 to P-12, P-15 to P-18, P-21 to P-24, P-27 to P-31) having a —S—C(=S)— skeleton prepared by RAFT polymerization and having a polymerization degree within the range of the present disclosure has high solubility in solvents and a high contact angle. It was also confirmed that the cured film using P-1, P-2, P-9, P-10, P-11, P-27, and P-30 has a low dielectric constant and a low dielectric tangent.

INDUSTRIAL APPLICABILITY

The surface-treating agent of the present disclosure can be suitably utilized to form a surface-treating layer on the surface of a variety of substrates, in particular optical members for which transparency is required. The surface-treating agent is also suitable as an insulator or a dielectric.

What is claimed is:

1. A fluorine-containing copolymer represented by the following formula (1) or (2):

(1)

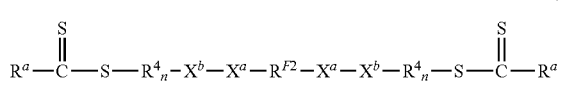

(2)

wherein
$R^{F1}$ is $Rf^1$—$R^F$—$O_q$—;
$R^{F2}$ is —$Rf^2_p$—$R^F$—$O_q$—;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is each independently a divalent fluoropolyether group;

p is 0 or 1;
q is each independently 0 or 1;
$R^4$ is each independently at each occurrence $R^{4a}$ or $R^{4b}$;
$R^{4a}$ is each independently at each occurrence a divalent organic group having a functional group selected from substituent group A;
$R^{4b}$ is —CH$_2$—CR$^{4d}$R$^{4e}$—,
wherein
$R^{4d}$ is a hydrogen atom or an alkyl group,
$R^{4e}$ is —COO—R$^{4f}$,
$R^{4f}$ is -linker-R$^{4g}$ or —R$^{4g}$,
the linker is one selected from (b) to (f):
(b) —(CHR$^{4h}$)$_{s2}$—O—, wherein s2 represents the number of repetitions, which is an integer of 1 to 40, and R$^{4h}$ represents hydrogen or a methyl group;
(c) —(CH$_2$—CH$_2$—O)$_{s1}$—CO—NH—CH$_2$—CH$_2$—O—, wherein s1 represents an integer of 1 to 10;
(d) —CH$_2$—CH$_2$—O—CH$_2$—CH$_2$—;
(e) —(CH$_2$)$_{s3}$—, wherein s3 represents an integer of 1 to 6; or
(f) —(CH$_2$)$_{s4}$—O—CONH—(CH$_2$)$_{s5}$—, wherein s4 represents an integer of 1 to 8, and s5 represents an integer of 1 to 6;
$R^{4g}$ is selected from (i) to (vi):
(i) an alkyl group;
(ii) a chain group comprising an alkyl group substituted with fluorine;
(iii) a group comprising one or more cyclic moieties selected from the group consisting of a monocyclic carbocycle, a bicyclic carbocycle, a tricyclic carbocycle and a tetracyclic carbocycle;
(iv) hydrogen, provided that the hydrogen atom is not bonded to the oxygen atom of the linker;
(v) a group comprising an imidazolium salt;
(vi) a group comprising silicon

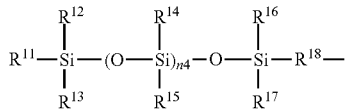

wherein, $R^{11}$, $R^{12}$, $R^{13}$, $R^{14}$, $R^{15}$, $R^{16}$, and $R^{17}$ are each independently an alkyl group or an aryl group;
n4 is an integer of 1 to 500;
$R^{18}$ is a divalent organic group;
the substituent group A is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof;
n is an integer of 1 to 100;
$X^a$ is each independently a divalent organic group;
$X^b$ is each independently a divalent organic group;
$R^a$ is each independently alkyl, phenyl, —SR$^{a1}$, —OR$^{a2}$, —NR$^{a3}$$_2$, or

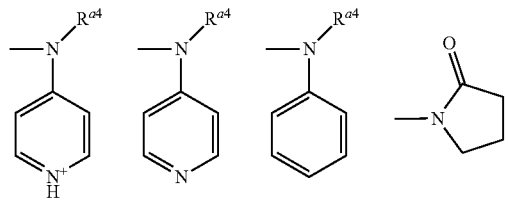

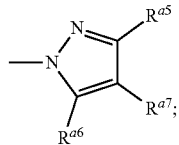

$R^{a1}$, $R^{a2}$, $R^{a3}$, $R^{a4}$, $R^{a5}$, and $R^{a6}$ are each independently an alkyl group or a phenyl group; and
$R^{a7}$ is a hydrogen atom or a halogen atom.

2. The fluorine-containing copolymer according to claim 1, wherein $R^F$ is each independently a group represented by the formula:

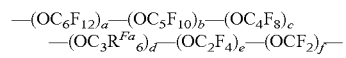

wherein $R^{Fa}$ is each independently at each occurrence a hydrogen atom, a fluorine atom, or a chlorine atom; and
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

3. The fluorine-containing copolymer according to claim 1, wherein $R^F$ is each independently a group represented by the following formula (f1), (f2), (f3), (f4), or (f5):

$$—(OC_3F_6)_d— \quad (f1)$$

wherein d is an integer of 1 to 200;

$$—(OC_4F_8)_c—(OC_3F_6)_d—(OC_2F_4)_e—(OCF_2)_f— \quad (f2)$$

wherein c and d are each independently an integer of 0 to 30;
e and f are each independently an integer of 1 to 200;
the sum of c, d, e, and f is an integer of 10 to 200; and
the occurrence order of the respective repeating units enclosed in parentheses provided with a subscript c, d, e, or f is not limited in the formula;

$$—(R^6—R^7)_g— \quad (f3)$$

wherein $R^6$ is OCF$_2$ or OC$_2$F$_4$;
$R^7$ is a group selected from OC$_2$F$_4$, OC$_3$F$_6$, OC$_4$F$_8$, OC$_5$F$_{10}$, and OC$_6$F$_{12}$, or is a combination of two or three groups selected from these groups; and
g is an integer of 2 to 100;

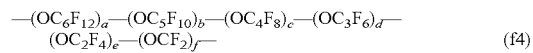

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and

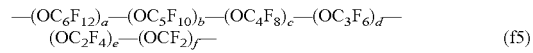

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

4. The fluorine-containing copolymer according to claim 1, wherein $R^4$ is $R^{4a}$.

5. The fluorine-containing copolymer according to claim 1, wherein $R^{4a}$ is a group represented by the following formula:

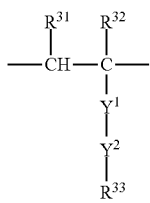

wherein
$R^{31}$ is each independently at each occurrence a hydrogen atom or an alkyl group;
$R^{32}$ is each independently at each occurrence a hydrogen atom, a chlorine atom, a fluorine atom, or an alkyl group optionally substituted with fluorine;
$R^{33}$ is each independently at each occurrence a functional group selected from substituent group A;
$Y^1$ is a single bond, —C(=O)O—, —C(=O)NH—, —OC(=O)—, —NHC(=O)—, —O—, —N($R^c$)—, phenylene or carbazolylene;
$R^c$ is an organic group; and
$Y^2$ is a single bond or a linker having 1 to 16 atoms in the main chain.

6. The fluorine-containing copolymer according to claim 1, wherein the functional group selected from substituent group A of $R^{4a}$ is a group having an epoxy group, a glycidyl group, an alicyclic epoxy group, an acryloyl group, or a methacryloyl group.

7. The fluorine-containing copolymer according to claim 1, wherein n is an integer of 2 to 50.

8. A surface-treating agent comprising one or more fluorine-containing copolymers according to claim 1.

9. A curable composition comprising:
the fluorine-containing copolymer according to claim 1; and
a matrix forming composition.

10. A curable composition comprising:
the surface-treating agent according to claim 8; and
a matrix forming composition.

11. A film formed from the surface-treating agent according to claim 8.

12. A film formed from the curable composition according to claim 9.

13. An article comprising:
a substrate; and
a layer formed on a surface of the substrate from the surface-treating agent according to claim 8.

14. An article comprising:
a substrate; and
a layer formed on a surface of the substrate from the curable composition according to claim 9.

15. The article according to claim 13, wherein the article is an optical member.

16. The article according to claim 13, which is a LiDAR cover member.

17. The article according to claim 13, which is a sensor member.

18. The article according to claim 13, which is an instrument panel cover member.

19. The article according to claim 13, which is an automobile interior member.

20. The article according to claim 13, which is an insulator or a dielectric.

* * * * *